United States Patent
Ikeda

Patent Number: 5,301,003
Date of Patent: Apr. 5, 1994

[54] THREE-DIMENSIONAL DISPLACEMENT MEASUREMENT APPARATUS AND METHOD WITH VERTICAL DISPLACEMENT MEASUREMENT COMPENSATION

[75] Inventor: Hiroshi Ikeda, Kawasaki, Japan

[73] Assignee: Fujitsu Limited, Kanagawa, Japan

[21] Appl. No.: 854,532

[22] Filed: Mar. 19, 1992

[30] Foreign Application Priority Data

Mar. 19, 1991 [JP] Japan .................. 3-078263

[51] Int. Cl.⁵ .......................... G01N 21/01
[52] U.S. Cl. .................... 356/73; 356/356; 356/357; 356/358; 356/363; 33/503; 33/551
[58] Field of Search ............ 356/72, 73, 375, 376, 356/356, 358, 359, 360, 373, 357, 363; 33/503, 551

[56] References Cited

U.S. PATENT DOCUMENTS 4,957,369 9/1990 Antonsson .................. 356/376

Primary Examiner—Davis L. Wills
Assistant Examiner—LaCharles P. Keesee
Attorney, Agent, or Firm—Staas & Halsey

[57] ABSTRACT

A three-dimensional displacement measurement apparatus includes a planar displacement measurement portion which measures a displacement of a measurement point on a surface of a measurement object in the direction of an X-Y plane, a vertical displacement measurement portion which measures a displacement of the surface in a vertical direction with respect to the X-Y plane, and a vertical displacement measurement position compensation portion that tracks a displacement of the measurement point on the X-Y plane.

7 Claims, 25 Drawing Sheets

INTENSITY OF LIGHT

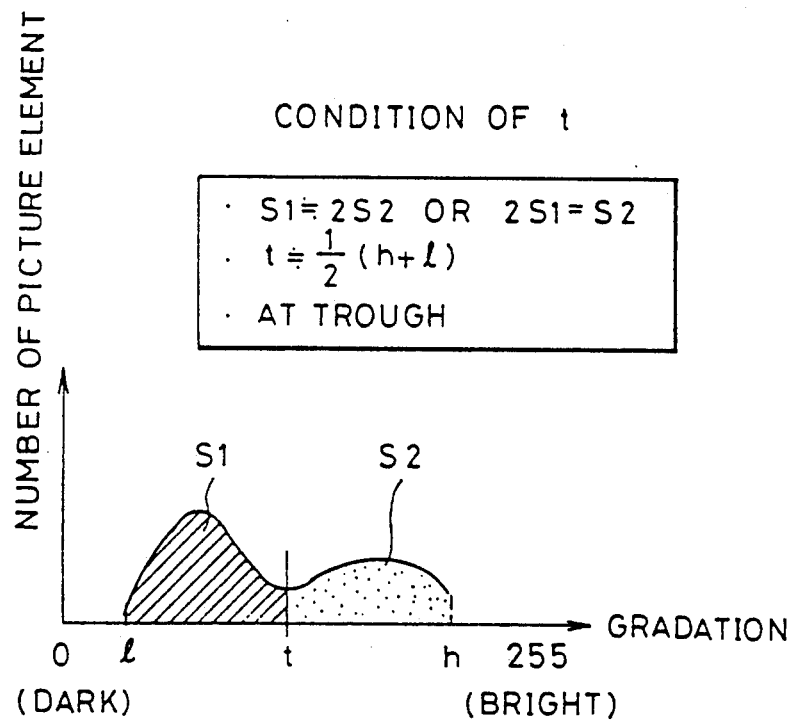

(PRIOR TO DESPLACEMENT)

(AFTER DISPLACEMENT)

$$\begin{cases} \text{CONFIGURATION} (5000 \times 5000) \\ \text{RESOLUTION} \quad 0.2 \, \mu m \end{cases}$$

$$\begin{cases} \text{CONFIGURATION} (500 \times 500) \\ \text{RESOLUTION} \quad 20 \, \mu m \end{cases}$$

$$\begin{cases} \overline{X_1} = \overline{X_0} + (X_1 - X_0) K \\ \overline{Y_1} = \overline{Y_0} + (Y_1 - Y_0) K \end{cases}$$

Here, $K = \dfrac{0.2}{20} = \dfrac{1}{100}$

THREE-DIMENSIONAL DISPLACEMENT MEASUREMENT APPARATUS AND METHOD WITH VERTICAL DISPLACEMENT MEASUREMENT COMPENSATION

BACKGROUND OF THE INVENTION

The present invention relates to a three-dimensional displacement measurement apparatus and method, and more particularly, to a three-dimensional displacement measurement apparatus and method that measures fine displacements in three dimensions of a specific point of a precision mechanism.

Products that require precise mechanisms require efforts for quality stability from the stage of design through to manufacture, and use structural analysis methods that are incorporated from the design stage as CAE. However, when there are fine displacements of mechanism systems under compounded conditions of the influence of heat and the like to coupling portions of assembly parts, the analysis is difficult and as a result, there is a large influence to both the quality of the final product and the manufacturing yield. Because of this, there is a sharply increased necessity for high-precision three-dimensional displacement measurement apparatus so as to enable product design incorporating consideration for fine displacements that occur due to changes in the installation environment (such as temperature and humidity and the like).

Conventional three-dimensional measurement apparatus include contact-type measurement apparatus that measure by using a probe to a surface for measurement, and three-dimensional measurement apparatus of the non-contact type which use a camera to measure a displacement in the xy-directions, and an interferometer to measure a displacement in a Z-direction. In addition, there is also the triangular measurement quantity type and the static capacitance type of non-contact displacement measurement apparatus for the Z-direction.

The photointerference type is the most suited for displacement measurement in the assembly stages of products.

However, each of the types of three-dimensional measurement apparatus mentioned above cannot measure the true three-dimensional displacement measurement of a measurement point on an object plane. This is because the measurement point is not tracked in the Z-direction in accordance with displacements in the xy-directions.

For determining a true displacement due to heat measurement of the three-dimensional displacement while tracking the measurement point with respect to an initial value is essential.

SUMMARY OF THE INVENTION

Accordingly, a general object of the present invention is to provide a three-dimensional displacement measurement apparatus and method which is a novel and effective means of solving this problem described above.

A more specific object of the present invention is to provide a three-dimensional displacement measurement apparatus that has a function to track a displacement of a place on a X-Y coordinate plane of a surface which is the object of measurement, and to change a measurement place of a vertical direction displacement.

According to the present invention, it is possible to measure a three-dimensional displacement while tracking a point that was the initial object, and to perform accurate three-dimensional measurement.

Another object of the present invention is to provide a three-dimensional displacement measuring method which is adapted to track a displacement of a place on a X-Y coordinate plane of a surface which is the object of measurement, change a measurement place of a vertical direction displacement.

According to the present invention, it is possible to measure a three-dimensional displacement while tracking a point that was the initial object, and to perform accurate three-dimensional measurement.

Other features of the present invention will be come clear from the following description of embodiments of the present invention, with reference to the appended drawings.

BRIEF DESCRIPTION OF THE DRAWINGS

FIG. 13 is a graph showing the setting characteristics of the value for t in FIG. 12, FIGS. 14A-C are views showing the detection processing for the minimum width direction of the interference stripe.

DETAILED DESCRIPTION OF THE PREFERRED EMBODIMENTS

Figure 1:
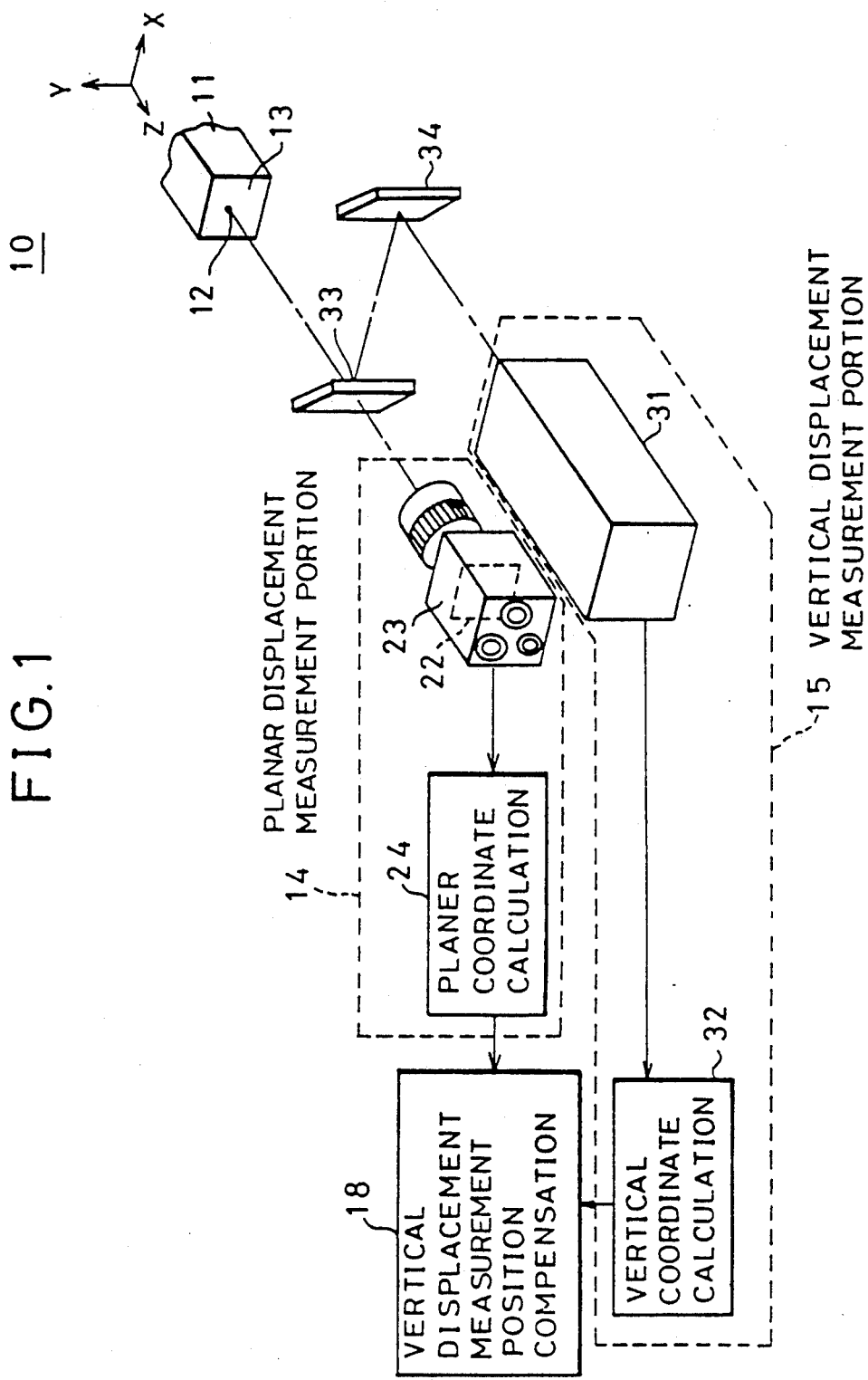
FIG. 1 is a view showing the principle of the three-dimensional displacement measurement apparatus of the present invention.

The following is a description of the principle of the present invention, with reference to FIG. 1.

A three-dimensional displacement measurement apparatus 10 basically includes a planar displacement measurement portion 14 that measures the displacement in the planar direction (X-Y plane) of a point 12 that is to be measured for the object of measurement 11, and a vertical displacement measurement portion 15 that measures a displacement in a direction (Z-direction) which is vertical to said surface of a surface portion 13 that includes the point 12.

Figure 2:
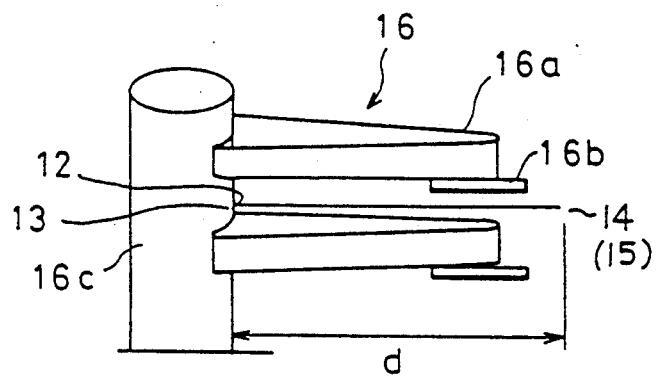
FIG. 2 is a view of one example of a measurement object.

As shown in FIG. 2, the object of measurement 11 is an actuator portion 16 of a magnetic disk apparatus. 16a is a head arm and 16b is a magnetic head. The surface portion 13 is one portion on a peripheral side surface of a spindle 16c, and the measurement point 12 is one point on this peripheral side surface. The distance d from the displacement measurement portions 14 and 15 to the point 12 is long at 200 mm or more.

The planar displacement measurement portion 14 includes a camera lens 21 and a camera element 22, a camera 23 and a planar coordinate calculation portion 24 that calculates planar coordinates of the point 12 from the image data.

The planar displacement measurement portion 14 comprises an interferometer 31 and a vertical coordinate calculation portion 32 that calculates the vertical displacement from the interference stripe of the interferometer 31. 33 is a half mirror and 34 is a reflecting mirror.

The three-dimensional displacement measurement apparatus 10 also comprises a vertical displacement measurement position compensation portion 18 that tracks a displacement of the point 12 on a plane that was measured by the planar displacement measurement portion 14 and that moves a measurement place of a displacement in the vertical direction by means of the vertical displacement measurement portion 15.

Figure 3:
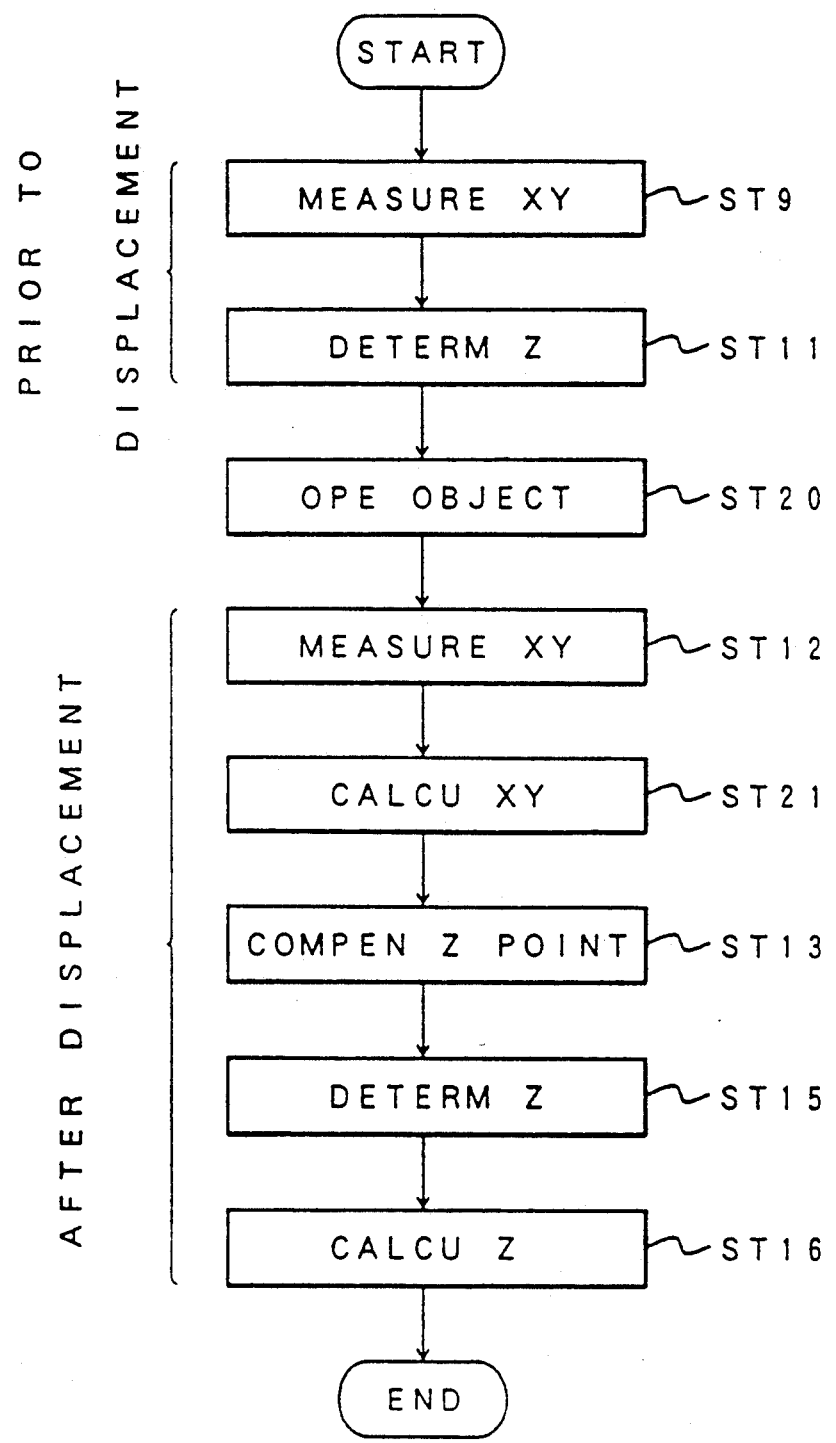
FIG. 3 is a view showing a three-dimensional displacement measurement apparatus that uses the apparatus of FIG. 1.

The three-dimensional displacement measuerment apparatus 10 having the configuration described above is used and the three-dimensional displacement measurement of the point 12 is performed according to the procedure shown in FIG. 3.

First, the planar displacement measurement portion 14 measures the X-Y coordinates of the point 12 prior to displacement.

After this, the vertical displacement measurement portion 15 determines a value in the Z-direction, of the point 12 prior to displacement.

This is followed by the operation of measurement object (ST20) so that the object of measurement 11 becomes a status where heat and force and the like are applied to it, and the point 12 is displaced in three dimensions.

The measurement is restarted when there is this status.

First, the planar displacement measurement portion 14 measures the X-Y coordinates of the point 12 after displacement (ST12).

After this, the measurement results of ST12 are used (in ST21) as the basis for calculation of the X-Y direction displacement amount of the point 12.

The calculation results from ST21 are used as the basis for compensating (ST13) the position of the Z-direction displacement measurement point.

Following this, the vertical displacement measurement portion 15 determines the value for the Z-direction (ST15).

Finally, the Z-direction displacement amount is calculated (ST16).

The vertical displacement measurement position compensation portion 18 in FIG. 1 performs steps ST21,13,15,16 and the point 12 that was first measured is tracked so as to enable measurement of the Z-direction displacement amount.

Accordingly, it becomes possible to accurately measure the three-dimensional displacement of the point 12 for when the object of measurement 11 has been displaced.

EMBODIMENT

Figure 4:
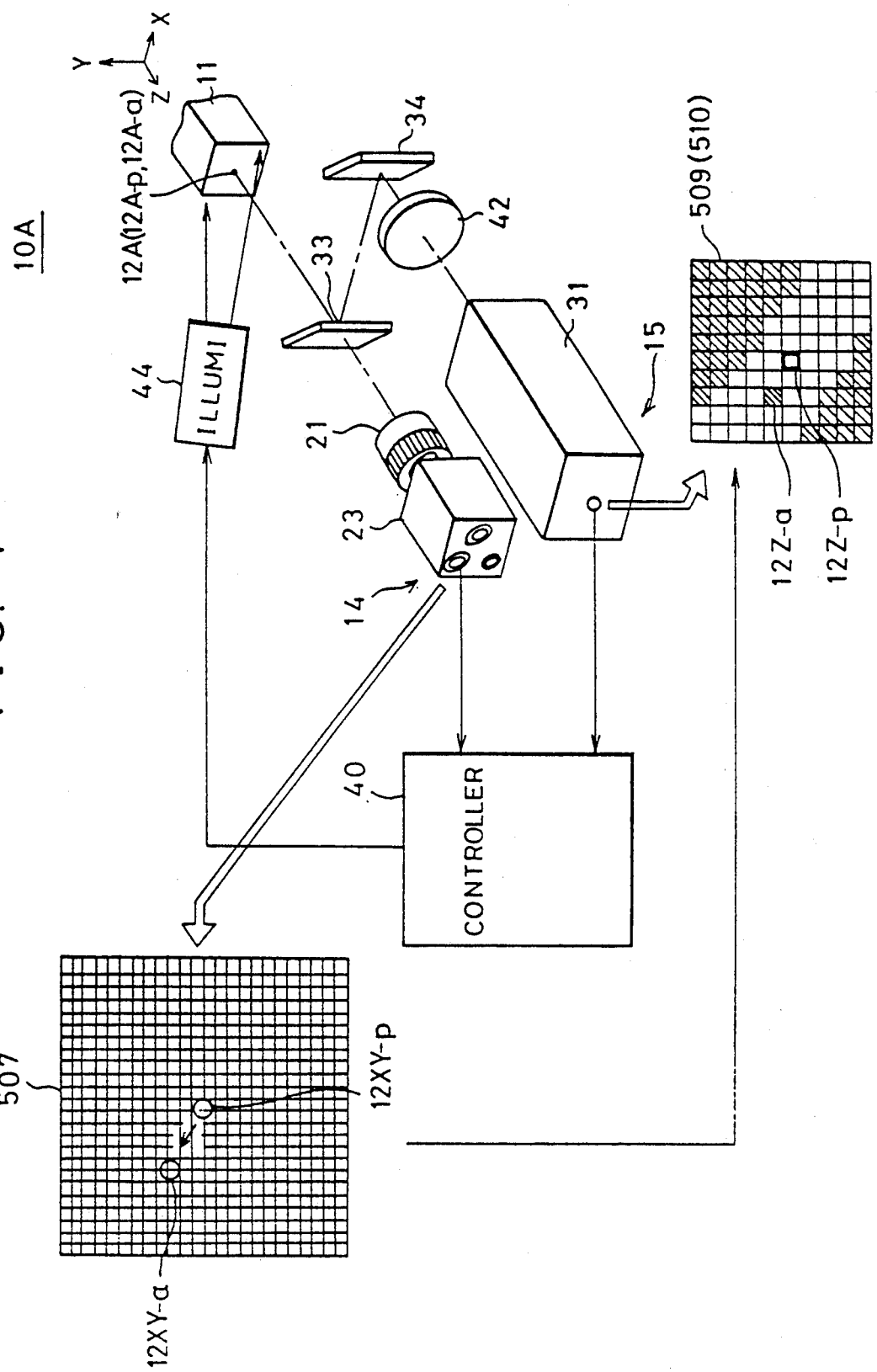
FIG. 4 is a view showing a status of position compensation of a vertical displacement measurement portion of a first embodiment of the three-dimensional displacement measurement apparatus according to the present invention.
Figure 5:
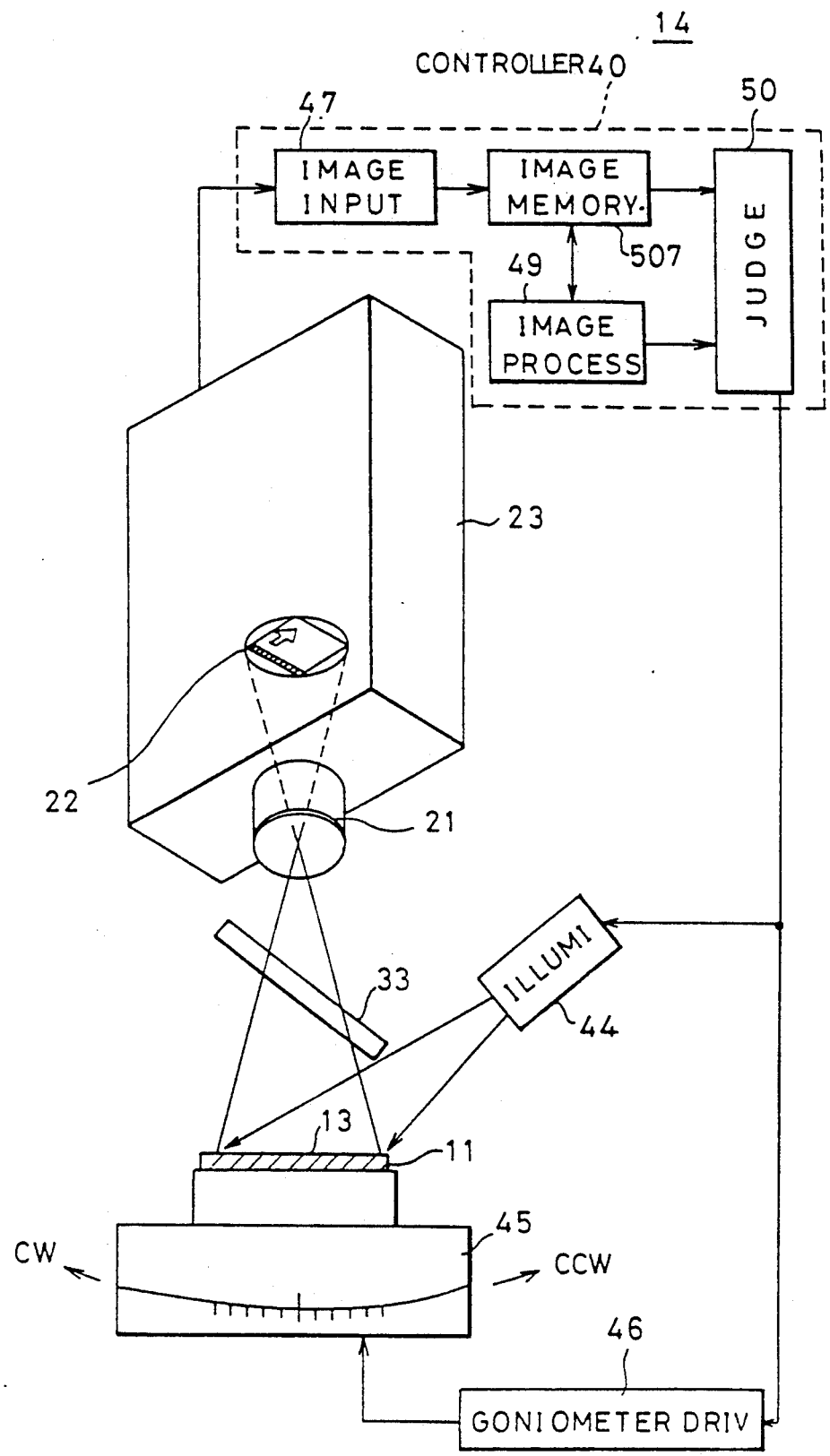
FIG. 5 is a view showing a configuration of a planar displacement measurement portion of a first embodiment of the three-dimensional displacement measurement apparatus according to the present invention.
Figure 6:
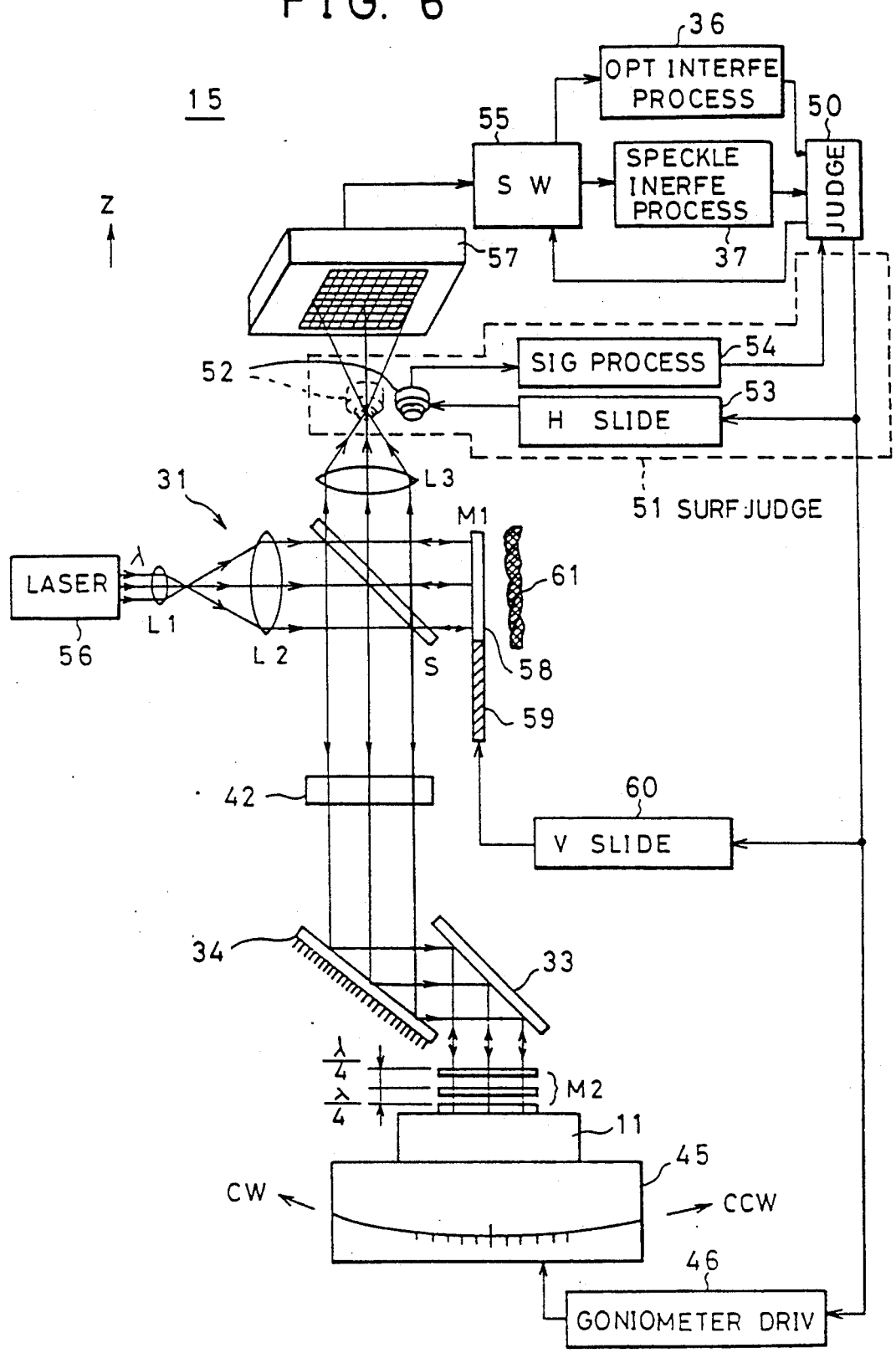
FIG. 6 is a view showing a configuration of a vertical displacement measurement portion of a first embodiment of the three-dimensional displacement measurement apparatus according to the present invention.

The following is a description of the three-dimensional displacement measurement apparatus 10A according to a first embodiment of the present invention, with reference to FIGS. 4 through 6.

In each of the figures, those portions that correspond to portions of FIG. 1 are indicated with corresponding numerals.

The point 12 is formed with a small circular mark 12A formed in a circular shape and fixed to it with adhesive tape.

Here, 12A denotes the mark (measurement point). 12XY-p denotes a measurement point on a memory 507 (refer to FIG. 7) prior to displacement. 12XY-a denotes a measurement point on the memory 507 after displacement. 12Z-p denotes a measurement point on a memory 509 or 510 (refer to FIG. 7) prior to displacement. 12Z-a denotes a measurement point on the memory 509 or 510 after displacement.

The optical system of the vertical displacement measurement portion 15 is provided with a band filter 42 that allows only light of a wavelength of laser light that is used by the vertical displacement measurement portion 15 to pass, the reflecting mirror 34 that reflects all of the light, and the half mirror 33 that reflects only half of the light and passes the other half. Therefore, the optical axis of the measurement portion 15 and the optical axis of the camera 23 of the planar displacement measurement portion 14 are made the same, so as to enable displacement measurement in both the planar direction and the vertical direction by a measurement from the one direction.

Then, the signals of the planar displacement measurement portion 14 and the vertical displacement measurement portion 15 are input to the controller 40. The controller 40 is an apparatus that includes the planar coordinate calculation portion 24, the vertical coordinate calculation portion 32, and the vertical displacement measurement position compensation portion 18. To the controller 40 is connected an illumination apparatus 44 that illuminates the display of the object of measurement when there is planar displacement measurement, and illuminates the object of measurement 11 in accordance with necessity.

Then, the vertical displacement measurement portion 15 performs compensation to move the measurement position in accordance with the displacement of the planar displacement calculated by the controller 40.

As can be seen in FIG. 5, the object of measurement 11 is mounted to an electric goniometer 40 and it is possible for that inclination to be made a required inclination by the goniometer drive means 46, upon instruction from the controller 40.

As shown in FIG. 5, the planar displacement measurement portion 14 is configured from a high-speed large camera 23, an image input portion 47, an image memory 507 that stores the image data, an image processing portion 49 that performs processing of the image data, and a judgment portion 50 that calculates the planar displacement from the image data that has been taken and had image processing implemented.

The camera 23 is configured from a camera lens 21 and a CCD line sensor 23, and take an image of the surface portion 13 of the object of measurement 11 at high speed.

The image input portion 47, image memory 507, image processing portion 49 and judgment portion 50 are each incorporated into the controller 40.

As shown in FIG. 6, the vertical displacement measurement portion 15 comprises the half mirror 33, the reflecting mirror 34 the band filter 42 and the interferometer 31 at the top.

The interferometer 31 measures the phase change and the number of movements of the interference stripes due to the optical path differences between the measurement surface M2 and the reference surface M1, and thus measures the displacement, in the vertical direction, of the measurement point on the object of measurement.

Then, the interferomete 31 is provided with a surface judgment means 51 that judges whether the measurement surface M2 of the object of measurement is a mirror surface that reflects all light, or a rough surface that disperses light.

This surface judgment portion 51 is provided with an optical detector 52 such a photodiode or the like, a horizontal slide means 53 that moves the optical detector 52 in and out with respect to the optical path of the laser light emitted from the lens L3, and an analog signal processing portion 54 that processes the signals of the optical detector 52.

The vertical displacement measurement portion 15 is provided with an optical interference signal processing portion 36 that processes the interference signals when the surface judgment means 51 judges that the measurement surface is a mirror surface, a speckle interference signal processing portion 37 that processes the interference signals when the surface judgment means 51 judges that the measurement surface is a rough surface, and a switching portion 55 that switches the signal from an area camera element 57 between the optical interference signal processing portion 36 and the speckle interference signal processing portion 37 in accordance with the judgment of the judgment means 51.

Furthermore, as shown in FIG. 6, the interferometer 31 is provided with a semiconductor laser 56 that generates laser light of wavelength $\lambda$ as the interference light, the two lenses L1,L2 that expand the area of the laser light, a half mirror S that passes the reference light to te reference surface and changes the optical path of the laser light, and an image-forming lens L3 that forms an image onto the area camera element 57 that converts the interference light rays into image signals.

The reference surface M1 has a regular reflecting mirror 58 that is used when there is light interference, and a uniform dispersion surface 59 such as a sheet of white paper and which is used when there is speckle interference. This reference surface M1 is moved by the vertical slide means 60 upon drive instructions from the judgment portion 50, in a manner such that the reference light is irradiated to a required reference surface, and there is no irradiation of reference light to the reference surface when surface judgment is made.

In the case where the reference surface has been shifted away when surface judgment is made, positions to which the reference light is irradiated are provided with a light-absorbing member 61 such as a black cloth or the like that absorbs the reference light.

Figure 7:
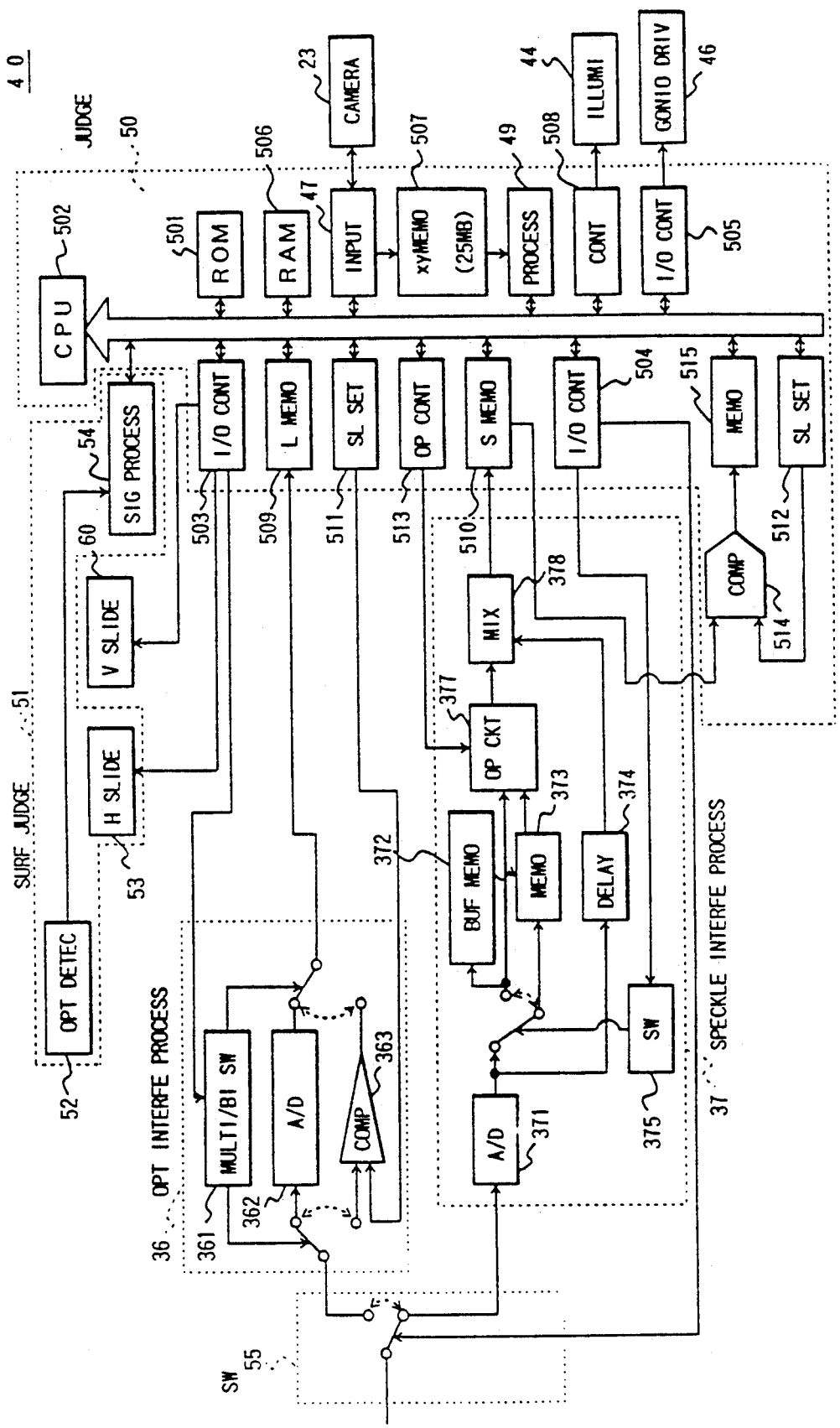
FIG. 7 is a block diagram showing a configuration of a controller of an embodiment of the three-dimensional displacement measurement apparatus according to the present invention.

The following is a description of the configuration of the controller 40, with reference to FIG. 7.

The controller 40 includes a optical interference signal processing portion 36, a speckle interference signal processing portion 37, a signal switching portion 55 and a judgment portion 50. The judgment portion 50 processes the signals of the high-speed, large camera 23 and signals from the optical detector 52 via the analog signal processing portion 54 and also performs drive control of the illumination apparatus 44, the goniometer drive means 46, the horizontal slide means 53 and the vertical slide means 60.

The optical interference signal processing portion 36 comprises a multiple/binary value switcher 361, an AD converter 362, and a comparator 363. The switcher 361 switches the output signals to the judgment portion 50 between the AD converter 362 and a comparator 363. The AD converter 362 is used for multi value image, and the comparator 363 is used for binary value image.

In addition, the speckle interference signal processing portion 37 includes an A/D converter 371, a buffer image memory 372, an image memory 373, a delay circuit 374, a digital image switching apparatus 375, a delay circuit 376, an image signal difference operation circuit 377 and an image mixer 378.

Then, the judgment portion 50 includes a central processing unit (CPU) 502 that operates as a planar coordinate calculation portion, vertical coordinate calculation portion and a vertical displacement measurement portion by processing a program stored in a ROM 501, I/O control portions 503,504,505 that perform control of the various types of input and output apparatus, a RAM 506, the image memory 507 that stores image data from the image input portion 47 and the camera 23, the image input portion 47, an illumination control portion 508 that performs control of the illumination apparatus 44, a light interference image memory 509 that stores light interference image data, a speckle interference image memory 510 that stores speckle interference data, two slice level setting portions 511,512 that set a binary slice level and send it to a comparators 63, 514, a operation control portion 513 that performs operation control of the image signal difference operation circuit 377 of the speckle interference signal processing portion 37, a digital comparator 514 that compares a value of a slice level setting portion 511 and a value of a slice level setting portion 512, and a binary image memory 515 that stores output of the comparator 514.

OUTLINE OF OPERATION

The following is a description of the operation of a three-dimensional displacement measurement apparatus 10A having the configuration described above.

Figure 8:
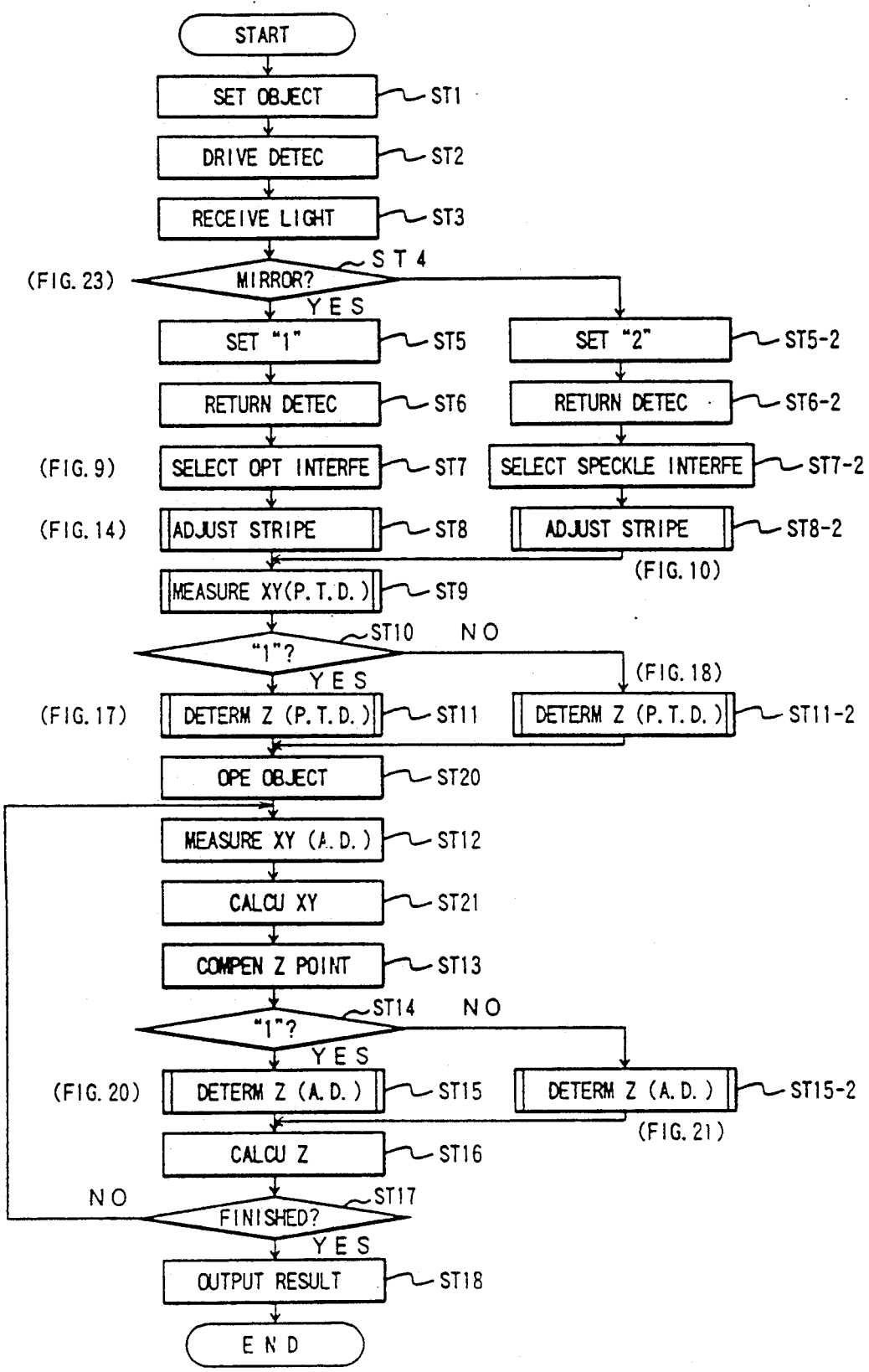
FIG. 8 is a flow chart showing an outline of the operation of the three-dimensional displacement measurement apparatus shown in FIG. 2.

FIG. 8 shows an outline of the operation of the three-dimensional displacement measurement apparatus according to the present invention.

First, the object of measurement is set (ST1).

More specifically, the object of measurement is set on the table of the electric goniometer 45 so that the optical axes of the measurement apparatus and the measurement point set on the surface of the object of measurement are in agreement.

The optical detector 52 is driven to the point of focus (ST2).

More specifically, the horizontal slide means 53 is driven so that the optical detector 52 is positioned at the point of focus (the position shown by the dotted line in FIG. 6) of the image-forming lens L3.

Light is received which is reflected from the surface of the object of measurement (ST3).

More specifically, the vertical slide means 60 (3-stage switching) is driven so that the reference surface M1 is set to the lowest position. Accordingly the laser light is absorbed by the light-absorbing portion 61, and only the laser light reflected from the surface of the object of measurement is irradiated to the optical detector 52.

The laser light is oscillated in this status, and the light reflected from the measurement surface M2 is received by the optical detector 52.

Judgment is performed for the object surface (ST4). If the surface has roughness greater than wavelength $\lambda$ of the laser light, then the surface is a rough surface and so there is a small amount of light irradiated to the optical detector 52. While if the surface has roughness less than wavelength $\lambda$ of the laser light, then the surface is a mirror surface and so there is a large amount of light irradiated to the optical detector 52. The size of this amount of light is detected for judging whether the surface is a rough surface or a mirror surface.

However, depending upon the difference of the amount of light reflected by the material of the object surface and the wavelength f the laser light that is used, different amounts of light are required to judge a rough surface and a mirror surface and so a reference value for the amount of light irradiated to the optical detector 52 is determined beforehand in accordance with the conditions.

Moreover, light amount detection is performed by the analog signal processing portion 54 and the judgment is performed by the judgment portion 50.

The following is a specific description of the operation in step ST4 will be made later.

If the result of judgment is YES, then "1" is set in the roughness register (ST5).

Then, the optical detector 52 is returned to the original position (ST6). More specifically, there is drive control for the horizontal slide means 53 and the optical detector 52 is returned to the position of the original position (shown by the solid line in FIG. 6), and the interference light is input to the area camera element 57.

Optical interference signal processing is then selected (ST7). More specifically, the reference surface M1 is drive-controlled by the vertical slide means 60 and aligned with the regular reflecting mirror 58, and the switching portion 55 is switched so that the photoelectric signals are input to the optical interference signal processing portion 36.

After this, th status of the inclination of the object surface in the initial status is determined, and the number of interference stripe is adjusted (ST8). ST8 is done, because if the inclination angle is the same, the same number of interference stripes appear irrespective of the angle of inclination, and the Z-coordinate (value) can not be specified.

More details of the operation will be described later, with reference to FIG. 9.

Also, if the result of the judgment of ST4 is NO, then "2" is set in the surface judgment register (ST5-2).

After this, the optical detector 52 and is returned to the original position (ST6-2).

After this, the speckle interference signal processing portion 37 is selected (ST7-2). More specifically, there is drive control of the reference surface by the vertical slide means 60, and alignment to a uniform dispersion surface 59, and the switching portion 55 is controlled so that the photoelectric signals are input to the speckle interference signal processing portion 37.

Following this, the number of speckle interference stripes (pseudo interference stripes) is adjusted by inclining the object of measurement (ST8-2).

More details of this operation will be described later, with reference to FIG. 10.

After step ST8 or ST8-2 have finished, there is measurement of the XY coordinates of the point 12XY-p prior to displacement (ST9).

More details of this operation will be described later, with reference to FIG. 16.

After this, there is a judgment for whether or not the value "1" is stored in the surface roughness register (ST10).

If the result of judgment is YES, then measurement of the Z displacement is performed, and the Z-direction value prior to displacement is determined (ST11).

More details of this operation will be described later, with reference to FIG. 17.

If the result of the judgment of step ST10 is NO, then Z displacement compensation is performed and the Z-direction value prior to displacement is determined (ST11-2).

More details of this operation will be described later, with reference to FIG. 18.

After this, the object of measurement 11 is operated or driven (ST20).

Due to driving, the influence of heat and the like causes the object of measurement 11 to distort, and the small circular mark 12A is finely displaced in three dimensions.

After this, measurement of the XY coordinates of the point 12XY-a is performed (ST12). More specifically, measurement of the displacement of the small circular mark 12A after displacement is performed in the same manner as the previous step ST9.

Following this, the XY direction displacement amount is calculated (ST21).

The difference between the XY coordinates $(x_0, y_0)$ prior to displacement and the XY coordinates $(x_1, y_1)$ after displacement is used to determine the actual displacement amount and the direction of displacement.

$$\Delta X1 = x_0 - x_1$$

$$\Delta Y1 = y_0 - y_1$$

Moreover, the direction of displacement depends upon the sign of $\Delta X1$ and $\Delta Y1$.

In addition, the following measurement after displacement is also performed.

The total displacement amount from the initial value prior to displacement, and the sector displacement amount from the previously measured value are respectively calculated as shown below.

Total displacement amount
$$\delta x = x_0 - x_n$$
$$\delta y = y_0 - y_n$$

Sector displacement amount
$$\Delta X = x_{n-1} - x_n$$
$$\Delta Y = y_{n-1} - y_n$$

Here, n indicates measurement data after n number of displacements.

After this, position compensation is performed for the z-displacement measurement point (ST13).

More specifically, compensation is performed in the following manner for the measurement point for the z-displacement measurement from the xy coordinates $(x_1, y_1)$ after displacement recognized in ST12, so that dynamic measurement tracked to the true three-dimensional position can be performed.

In the following, it is assumed that the configuration of the large image memory for xy displacement measurement and the configuration of the image memory for z-displacement measurement (and the configuration of the memories for speckle interference and optical interference) are those shown in FIG. 22.

Figure 22A:
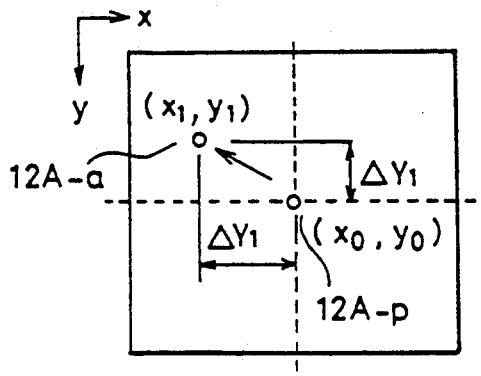
Figure 22B:
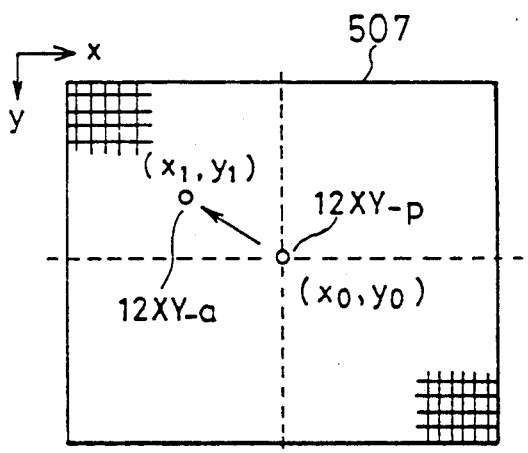
Figure 22C:
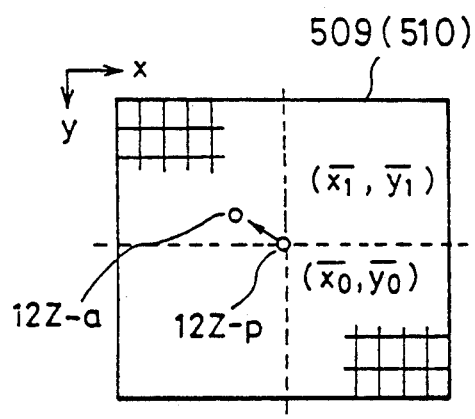

FIG. 22 (A) shows the measurement surface and that the mark 12A has been displaced from 12A-p to 12A-a.

FIG. 22 (B) shows the status where the information of the measurement surface shown in FIG. 22 (A) has been take into the large-screen image memory 507 (FIG. 7) for XY displacement measurement. The large-screen image memory 507 has a picture element configuration of 5000×5000, and the picture element resolution is 0.2 μm.

FIG. 22 (C) shows the status when the information of measurement surface shown in FIG. 22 (A) has been taken into the image memory 509 or 510. The image memory 509 or 510 has a picture element configuration of 500×500, and a picture element solution of 20 μm.

The large-screen image memory 507 and the image memory 509 (510) are different and so it is necessary to compensate the measurement point.

In FIG. 22 (C), the coordinates of the measurement point 12Z-p prior to compensation are made $(\overline{X}_0, \overline{Y}_0)$ and the coordinates of the measurement point 12Z-a after compensation are made $(\overline{X}_1, \overline{Y}_1)$.

The coordinates of the measurement point 12Z-a after compensation $(\overline{X}_1, \overline{Y}_1)$ are determined in the following equations.

$$\overline{X}_1 = \overline{X}_0 + (X_1 - X_0) \cdot k$$

$$\overline{Y}_1 = \overline{Y}_0 + (Y_1 - Y_0) \cdot k$$

Here, k is the ratio of the degrees of resolution of the large-screen image memory 507 and the Z displacement measurement image memory 509 (510), and $k = 0.2/20 = 1/100$.

After this, a judgment is performed for whether or not the value of surface roughness register is "1" (ST14).

If the result of this judgment is YES, then Z displacement measurement is performed (ST15).

Following this, the value in the Z direction after displacement is determined in accordance with the flow chart shown in FIG. 20, as will be described later.

If the result of the judgment of step 14 is NO, then Z displacement measurement is performed (ST15-2).

Figure 21:
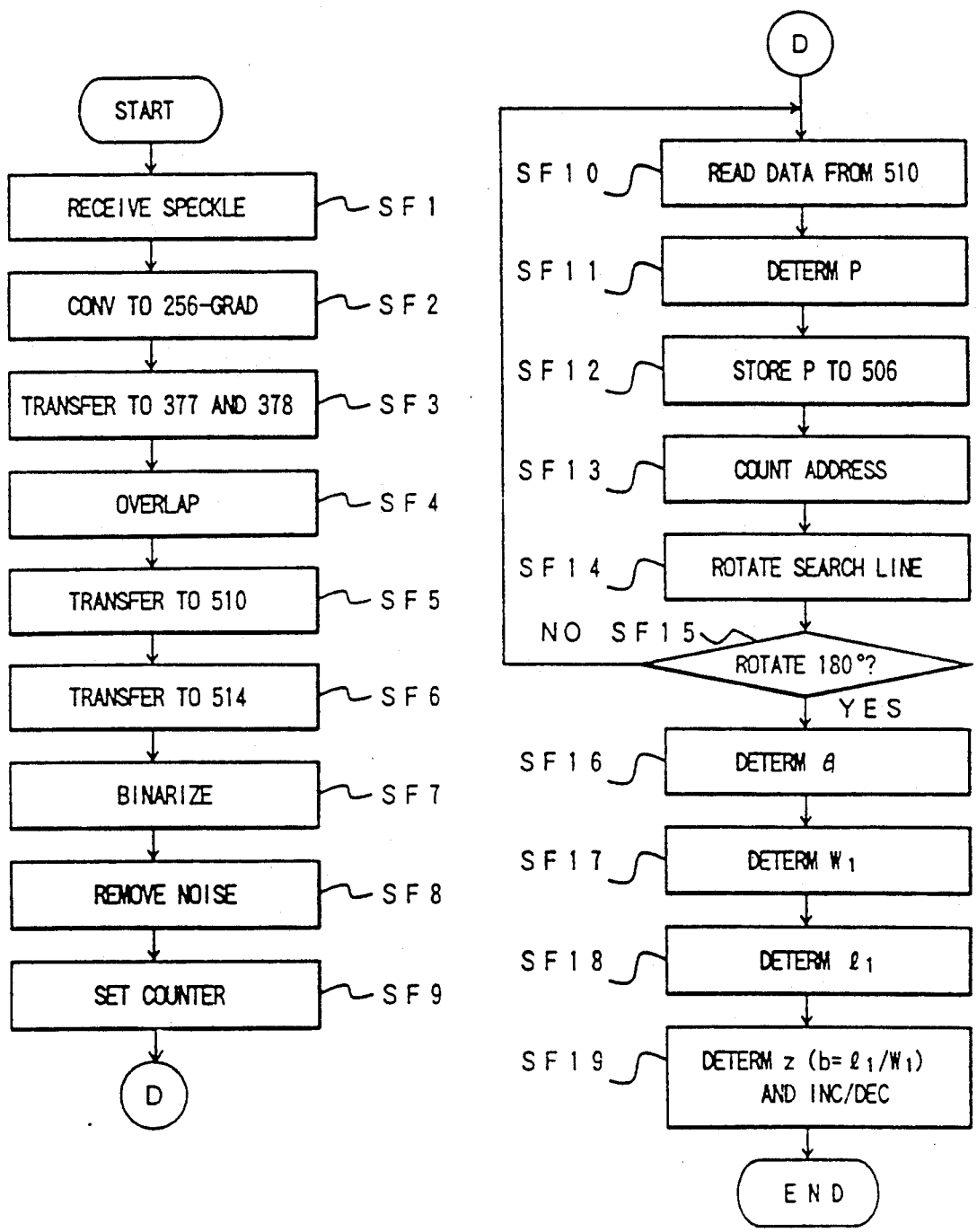
FIG. 21 is a flow chart showing in detail the operation of step ST15-2 of FIG. 8, FIGS. 22A—C are views showing the processing for the compensation of the measurement point of vertical displacement.

Following this, the value in the Z direction after displacement is determined in accordance with the flow chart shown in FIG. 21, as will be described later.

After step ST15 or ST15-2, there is calculation of the displacement amount (ST16), as will be described later.

After this, there is a judgment for whether or not the measurement has finished (ST17). The three-dimensional displacement measurement is repeated until measurement has been performed a required number of times.

Finally, the three-dimensional displacement measurement results are output in a required format (ST18) to complete the three-dimensional measurement operation.

DETAILED OPERATION OF STEPS

The following is a description of the operation for the steps ST8, ST8-2, ST9, ST11, ST11-2, ST13, ST15, ST15-2 and ST4 of FIG. 8.

[step ST8] (refer to FIGS. 9, 11, 12, 14)

Figure 9:
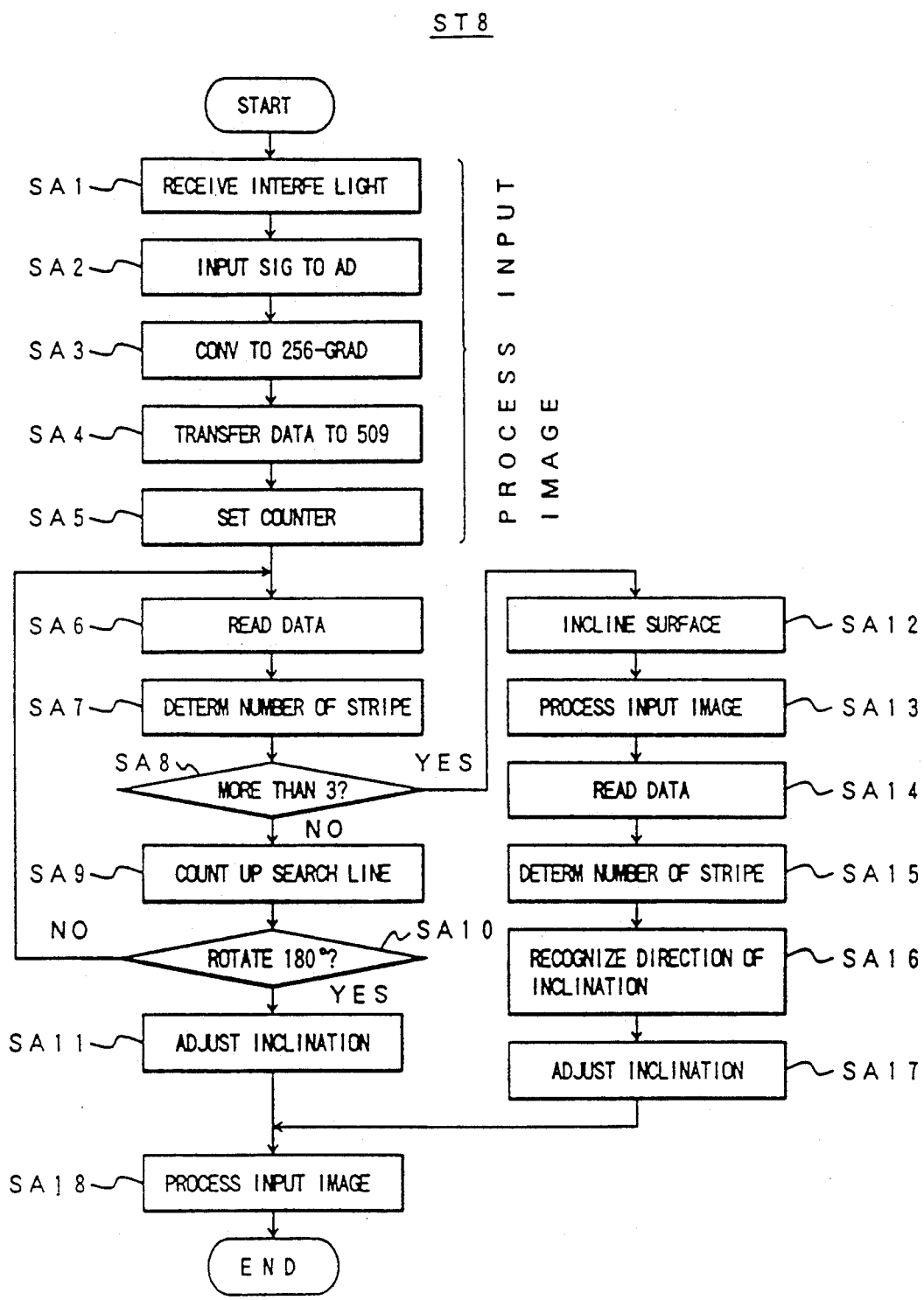
FIG. 9 is a flow chart showing in detail the operation of step ST8 of FIG. 8.

The following is a description of the operation for step ST8, with reference to FIG. 9.

First, the interference light is received by the area camera element 57 (SA1), the multiple/binary value switcher 361 is controlled and the photoelectric signals are input to the AD converter 362 (SA2).

Then, the brightness of the interference light from the AD converter 362 is made into data of 256 gradations (SA3), and the digital data is transferred to the optical interference image memory 509 (SA4).

Figure 12A:
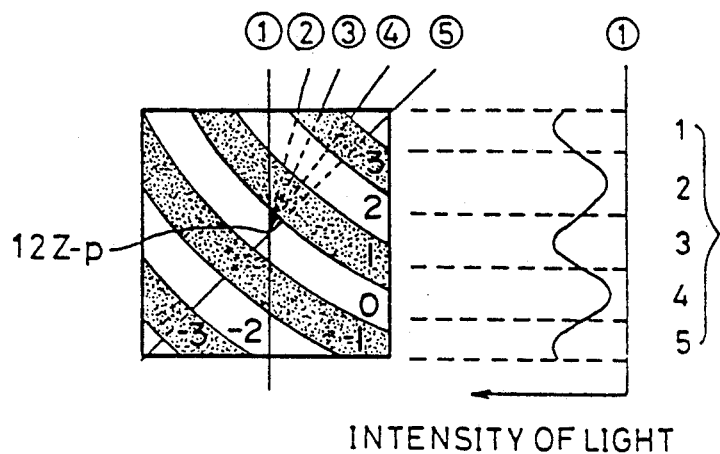
FIGS. 12A-B are views for describing the interference stripe number adjustment and binarization of the image.
Figure 14A:
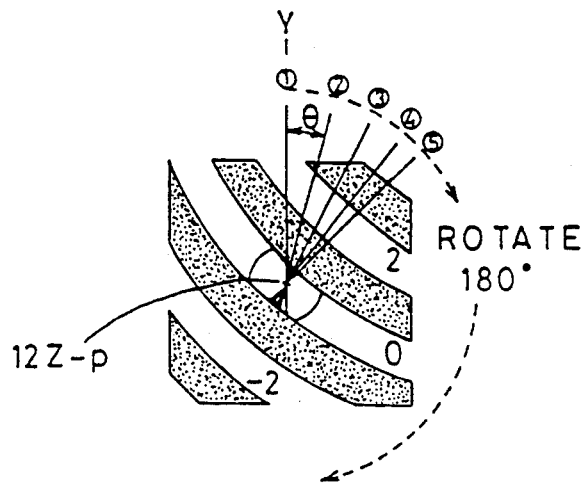

Furthermore, the Y axis ① passing through the point of measurement 12Z-p is made the start line for setting the counter, as shown in FIGS. 12(A) and 14(A) (SA5).

Then, the brightness data on the line that is set in the counter is read (SA6), and those portions for which the gradations differ greatly are searched to determine the number of stripes of bright and dark (SA7).

Here, when the number of stripes is less than three (SA8), the measurement point 12Z-p is made the center, the search line is rotated by a certain angle θ (shown by ① through ⑤ in FIG. 12 (A) and FIG. 14(A)), and count up of the search line is performed (SA9).

Then, he steps SA6 through SA9 are executed (SA10) until the rotation angle reaches 180° as shown in FIG. 14(A) (SA10).

Figure 12B:
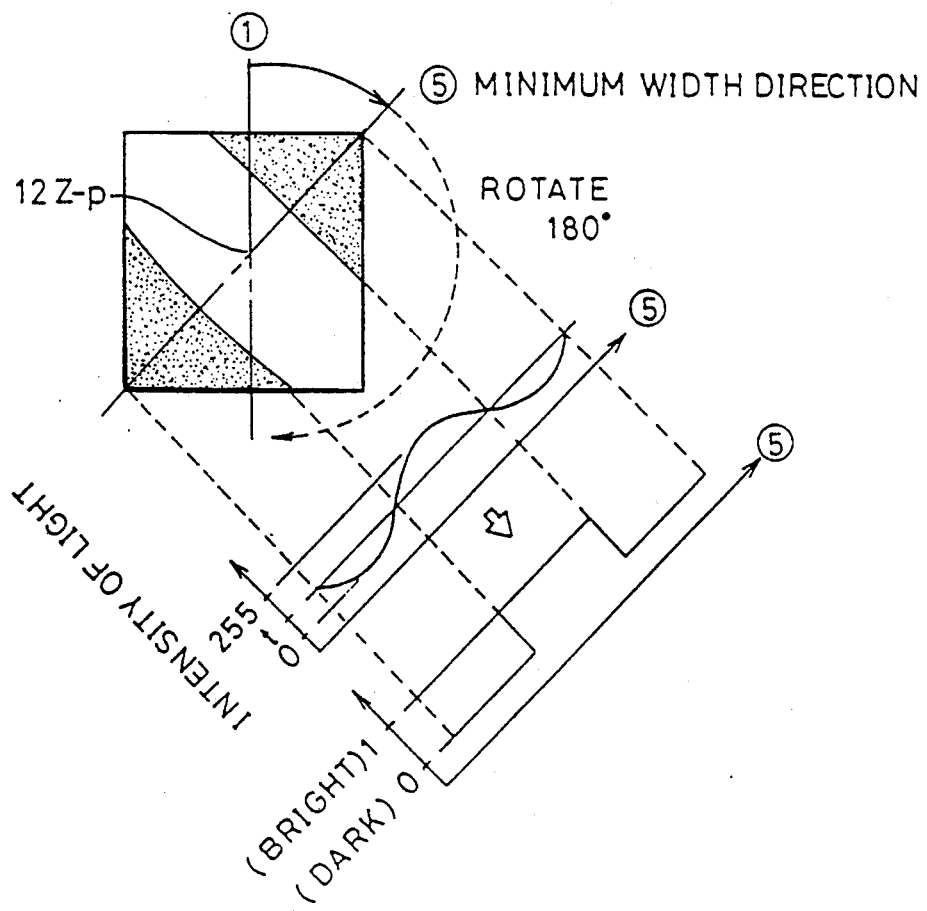

Once the rotation angle has reached 180° the electric goniometer 45 is driven so that the angle of inclination of the measurement object surface is rased in the forward direction so that the number of dark and bright stripes is 3 as shown in FIG. 12(B) (SA11). Then, the image input processing is performed (SA18).

In addition, in SA8, when the number of dark and bright stripes is 3 or more, there is drive control of the electric goniometer 45 so that the measurement object surface is raised by a fine angle of inclination ($\Phi$) in the forward direction (SA12). Then, the processing of SA1 through SA4 is performed (SA13).

There is the read of brightness data on the line that s set in the counter (SA14). Then, portion for which the gradations are largely different is searched so that the number of dark and bright stripes is determined as shown in FIG. 12(A) (SA15).

Then, the numbers of stripes before and after inclination are compared so that it direction of inclination of the measurement object surface is recognized (SA16). When there is an increase in the number of stripes, it is known that the front of the object surface has been raised. When there is a decrease in the number of stripes, it is known that the front of the object surface has been lowered.

Then, the electric goniometer adjusts the inclination of the measurement object surface by raising the front of the measurement object surface so that the number of dark and bright stripes becomes 3, using the current inclination direction of the surface as the reference (SA17). Accordingly the inclination direction of the measurement object surface is specified and there becomes the status for the performance of the image input processing.

The image input processing is performed after adjustment (SA18).

When the object surface is completely vertical with respect to the optical axis, there is the status where the interference stripes are completely black or white for the entire surface an it is not possible to have measurement prior to displacement. The measurement surface is therefore inclined suitably with respect to the object surface so that interference stripes are generated (and in the case of this example, so that the number of iterference stripes becomes 3).

In addition, the movement of the interference stripes can be in one of four statuses shown in FIG. 11 (A) through (D) depending on the direction of displacement and the direction of inclination of the object surface. Therefore, it is not possible to recognize the direction of displacement from only the direction of movement of the stripes.

For this reason, the direction of inclination of the object surface is inclined in a known direction (the direction where the front is raised, in this example) prior to displacement measurement.

Figure 10:
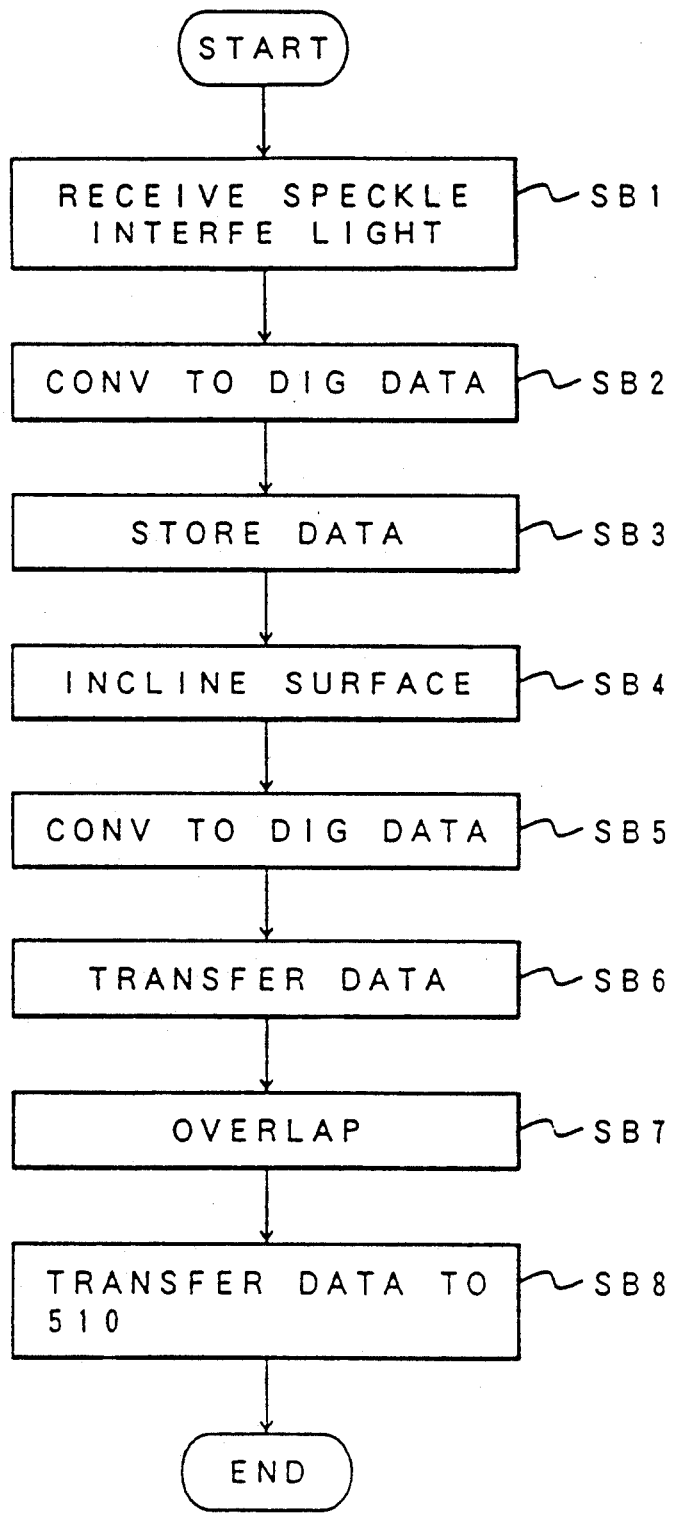
FIG. 10 is a flow chart showing in detail the operation of step ST8-2 of FIG. 8, FIG. 11A-D are views showing the relationship between movement of the interference stripe and the inclination of the measurement object plane.
Figure 11A:
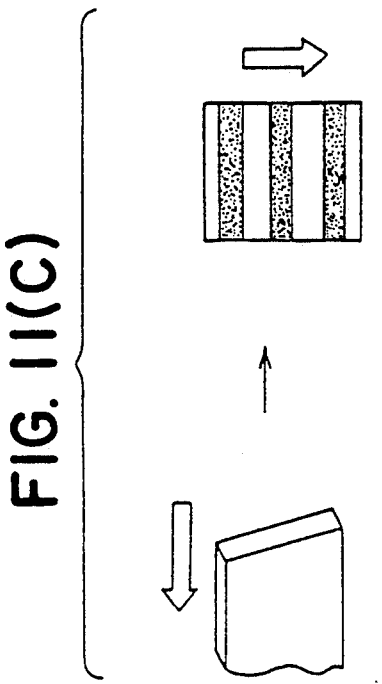
Figure 11C:
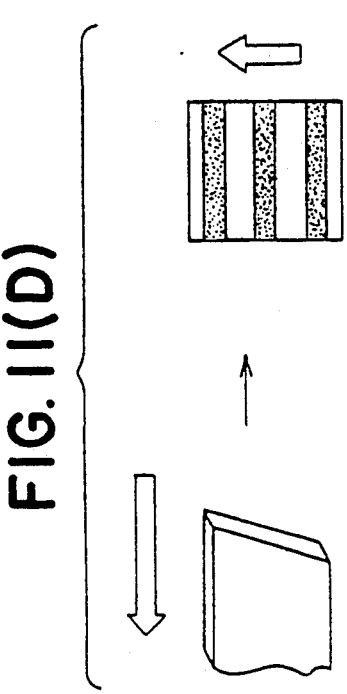
Figure 11B:
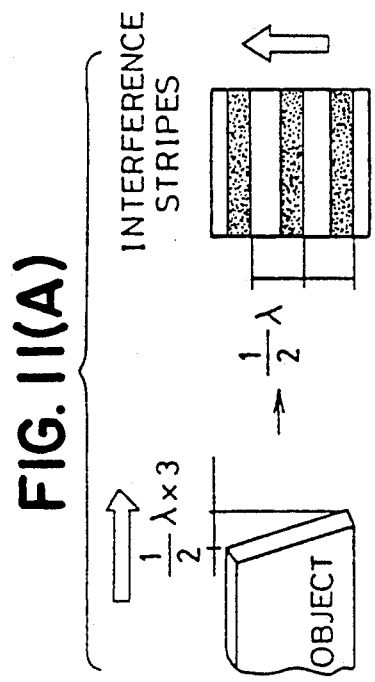
Figure 11D:
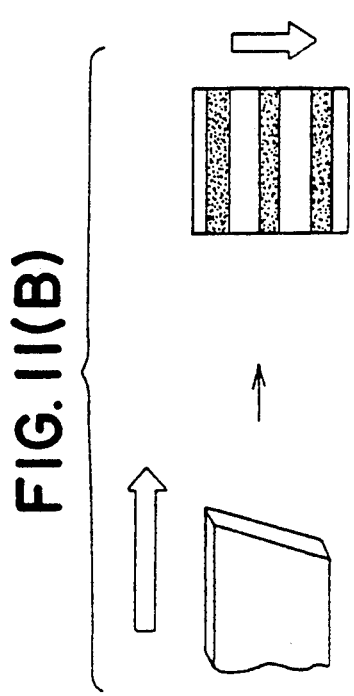

[step ST8-2] (refer to FIGS. 6, 7, 10)

The following is a description of the operation for step ST8-2, with reference to FIG. 10.

First, the area camera element 57 receives the speckle interference light (SB1), and the brightness of the interference light is made into 256-gradation data by the A/D converter 371 (SB2). Then, the digital switching apparatus 375 is controlled and the image data is stored in the image memory 373 (SB3). After this, there is dive control for the electric goniometer 45 and the measurement object surface is inclined forward by the small angle ($\Phi$) so that there are three interference stripes (SB4).

After this, the image of the surface that has been inclined is taken in once again, and the brightness of the interference light is made into 256-gradation data by the A/D converter 371 (SB5).

Following this, the digital image switcher 375 is controlled and the image data is transferred to the image signal difference calculation circuit 377 and the difference with the data on the image memory 373, that is, the change portion is extracted and the same screen is transferred to the image mixer 378 via the delay circuit 374 (SB6).

After this, the difference image and the initial image from the delay circuit 374 are overlapped (SB7) and then the digital data is transferred to the speckle interference memory 510 (SB8).

Figure 16A:
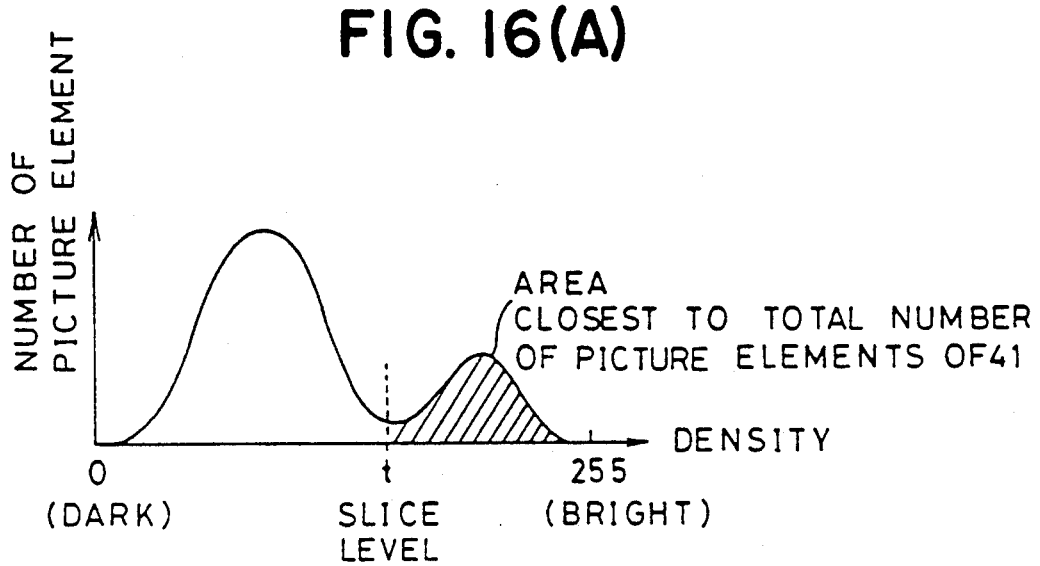
FIGS. 16A-C are views showing the measurement processing for the plane displacement measurement portion.
Figure 16B:
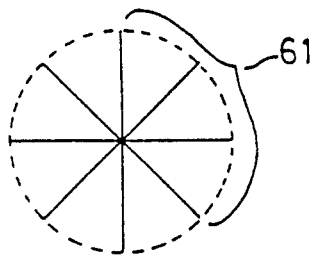
Figure 16C:
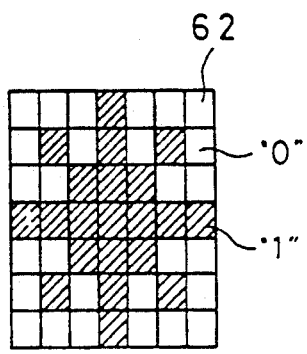

[step ST9] (refer to FIGS. 5, 7, 16)

The following is a description of the operation for step ST9, with reference to FIG. 16.

i) The image of the entire field and including the measurement mark 12A-p prior to displacement is taken in by the high-speed, large-screen camera 23. Moreover, when this is done, the illumination apparatus 44 is turned on and illumination light of high brightness is irradiate to the measurement surface.

ii) The image signals from the camera 23 are sent to the image input portion 47, undergo A/D conversion and are then sent to the image memory 507.

iii) The data of the image memory 507 is accessed, and the number of picture elements corresponding to each density is counted to create the density histogram shown in FIG. 16 (A).

iv) The total number of picture elements of the circular mark 12A-p which is the object is already known from a design value. Accordingly, the area that is closest to this value is integrated and determined from the brighter portion of the histogram, and the density t at that time is made the binarized slice level.

v) The image picture is binarized according to "t". More specifically, the circular mark portion is made "1" and the other portions are converted to "0".

vi) The circular mark which is the object is divided into eight equal portions by the four straight lines 61 shown in FIG. 16 (B), and these four straight lines are provided as a template 62 shown in FIG. 16 (C). Here, the circle has a diameter made of seven picture elements.

With the left, upper corner of the image memory used as the start point, the template 62 is shifted to the right by one picture element at a time while the area of the overlap of the image and the template at each position is determined, and that position of the circular mark which is the object is recognized by the detection of the position where the area of the overlap becomes maximum. This recognized position is ($x_0$, $y_0$).

Here, when only those portions where the template is "1" are taken as the object, only those cases where the value on the image and corresponding to the template becomes "1" are counted up and the overlap area at that position is determined.

Moreover, in the measurement prior to displacement, the center position of the camera field and the measurement position (the position of the circular mark) are practically in agreement (with only the error of the initial alignment) Therefore, the range of movement of the template can be only a small range about the center of the image memory.

Step ST12 of FIG. 8 is performed in substantially the same manner as described above.

Here, the XY coordinates of the mark 41 prior to displacement are and the value of the displacement amount that is predicted for the mark 41 are used to determine the range of movement of the template 62.

Accordingly, the step ST12 is processed at high speed.

[step ST11] (refer to FIGS. 12, 14, 15, 17)

Figure 17:
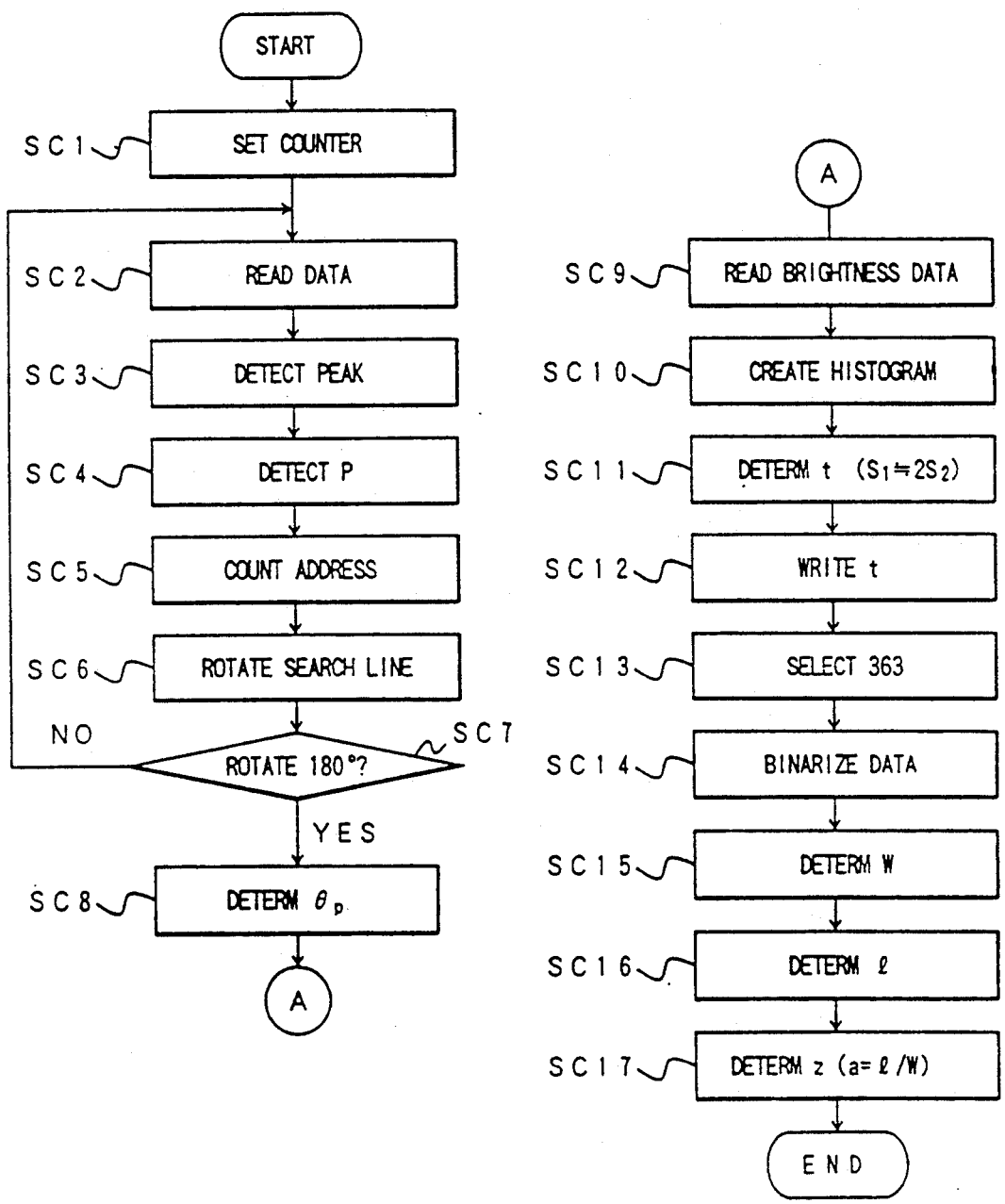
FIG. 17 is a flow chart showing in detail the operation of step ST11 of FIG. 8.

The following is a description of the operation for step ST11, with reference to FIG. 17.

The following operation is performed by the CPU 502 according to a program stored in the ROM 501 of FIG. 7.

First, the Y axis through which the measurement point passes is made the start line and set in the counter (SC1), and the brightness data of the line that is set in the counter is read from the optical interference memory 509 (SC2). Then, the position where the gradations, that is, the interference light amount becomes a peak around the measurement point, i detected (SC3), and the pitch P between peaks is determined and stored in the RAM 506 (SC4). Furthermore, the RAM address is counted up (SC5). The search line is then rotated clockwise by a predetermined angle about the measurement point 12Z-p, that is, the search line is counted up (SC6).

Steps SC2 through SC6 are performed and there is rotation until 180° is reached as shown in FIG. 12(B) (SC7). When the rotation has reached 180°, the angle $\theta p$ where the pitch P between peaks becomes minimum as shown in FIG. 14 (B) is determined and that direction is made the minimum width direction (SC8).

Following this, the brightness data of the minimum width direction $\theta p$ are read from the image memory 509 (SC9), and a density histogram is created as shown in FIG. 13 (SC10), Then the binarization slice level t is determined so that S1 and 2S2 become the closest as shown in FIG. 13 (SC11) and this value is write into the slice level setting portion 511 (SC12).

Furthermore, the multiple/binary value switcher 361 selects the comparator 363 (SC13), and after this, binarization is performed by the comparator 363.

Figure 14B:
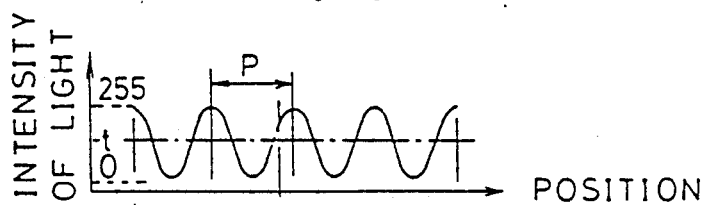
Figure 14C:
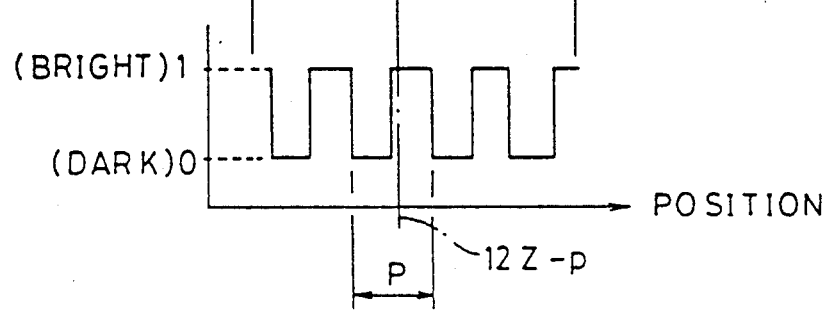
Figure 15A:
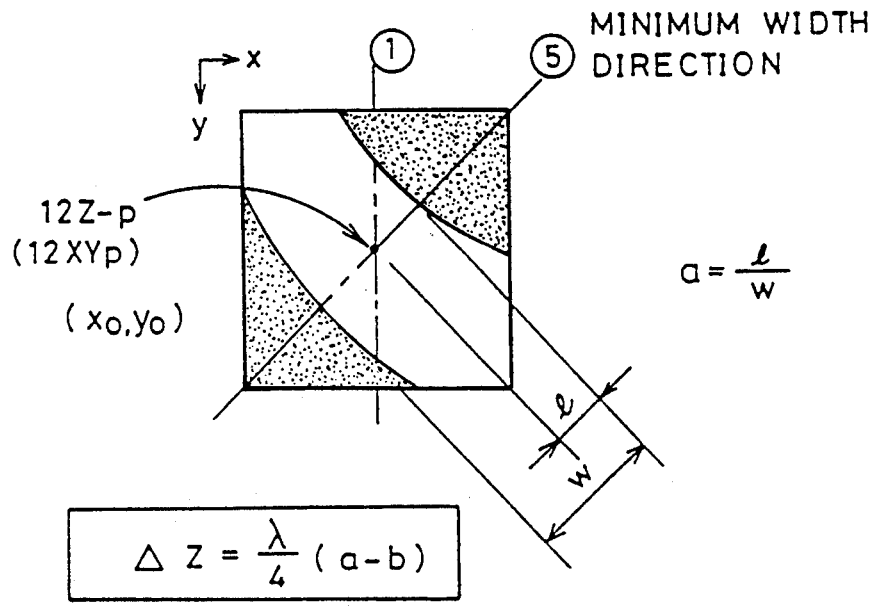
FIGS. 15A-B are views showing the calculation processing for the compensation peak, and compensation of the vertical displacement measurement point.
Figure 15B:
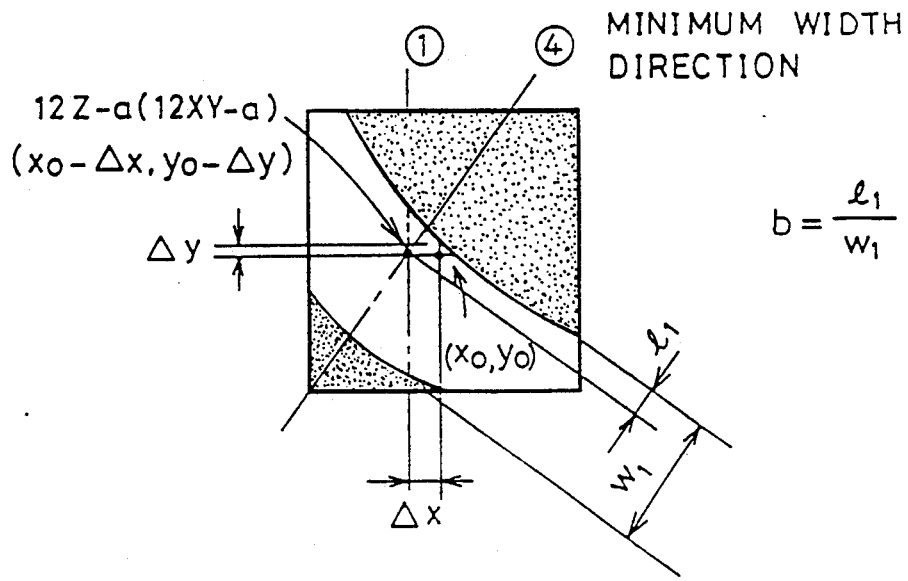

Here, as shown in FIG. 12 (B) and FIG. 14 (C), the brightness data is binarized by the software according to the slice level t (SC14) and as shown in FIG. 15 (A), the minimum width W is determined (SC15) for the bright and dark stripes that include the measurement point with respect to the binarized brightness data of the minimum width direction $\theta p$.

Here, determination of minimum width W is carried out for secifying the direction ⑤ and for minimizing occurence of error.

Furthermore, the distance from the measurement point to the end portion is determined as 1 (SC16). By this, as shown in FIG. 15 (A), the value of the vertical (z) direction prior to displacement is determined as $a=1/W$ (SC17) and there is end.

In this manner, determining the displacement of a measurement point inside one stripes because the displacement in the Z direction of the displacement amount is minimum and is less than half the laser wavelength. More specifically, the measurement point remains within the width of the same stripe after displacement as it was before.

[step ST11-2] (refer to FIGS. 7, 14, 15, 18, 19)

Figure 18:
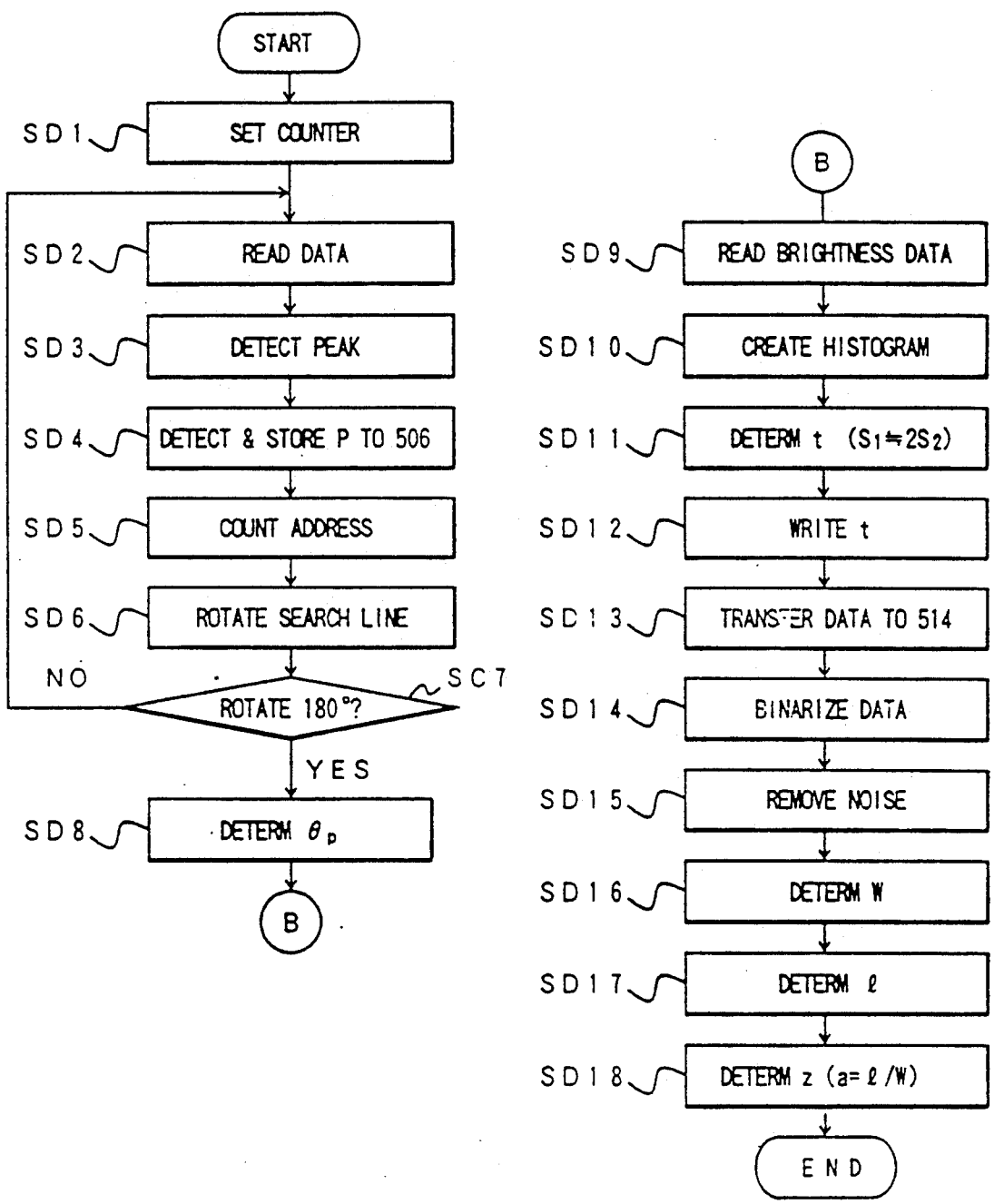
FIG. 18 is a flow chart showing in detail the operation of step ST11-2 of FIG. 8.

Following is a description of the operation of step ST11-2, with reference to FIG. 18.

As shown in FIG. 18, the Y axis through which the measurement point passes is made the start line and set in the counter (SD1), and the brightness data of the line that is set in the counter is read from the speckle interference memory 510 (SD2). Then, the position where the gradations, that is, the interference light amount become peak at both sides of the measurement point 12Z-p, is detected (SD3), and the pitch P between peaks is determined, as shown FIG. 14, and stored in the RAM 506 (SD4). Furthermore, the RAM address is counted up (SD5). The search line is then rotated clockwise by a required angle using the measurement point as the origin, that is, the search line is counted up (SD5).

Steps SD2 through SD6 are performed and there is rotation until 180° is reached (SD7). When the rotation has reached 180°, the angle $\theta p$ for where the pitch P between peaks becomes minimum is determined and that direction is made the minimum width direction (SD8).

Following this, the brightness data of the minimum width direction $\theta p$ are read from the image memory 59 (SD9), and a density histogram is created (SD10).

The binarization slice level t is determined so that S1 and 2S2 become the closest (SD11) and this value is read into the slice level setting portion 512 (SD12).

Then, the data from the speckle interference image memory 510 is transferred to the digital comparator 514 (SD13).

After this, binarization is performed by the slice level (SD14). After this, binarized images for the speckle interference stripe and which have much noise, have that noise removed as shown in FIG. 19 (SD15).

Following this, the binarized brightness data for the minimum width direction $\theta p$ has the minimum width W for the bright or dark stripes that include the measurement point, determined (SD16).

After this, the distance from the measurement point to the end portion is determined as 1 (SD16), as shown in FIG. 15 (A). Accordingly, the value of the vertical (z) direction prior to displacement is determined as $a=1/W$ (SD17) and there is end.

Figure 19:
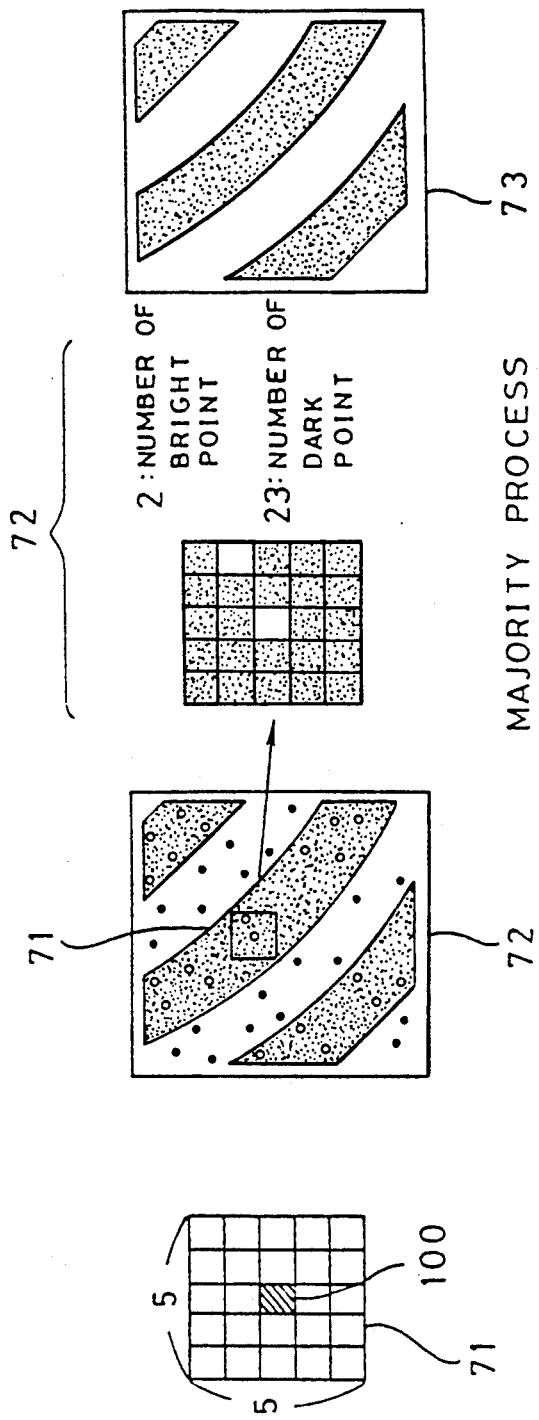
FIG. 19 is a view showing the processing for the removal of interference stripe noise in the speckle interference.

The following is a description of the removal of noise in SD15, with reference to FIG. 19.

A matrix 71 of 5×5 picture elements for example and which has the object picture element 100 at the center there of, is moved one picture element at a time across a full screen 72 of original image.

The number of bright points and the number of dark points inside the matrix are compared at each of the positions of movement, and the bright and dark of the object picture element 100 is determined as the majority result.

72 shows a specific example of the majority decision processing.

Here, there are two bright points and 23 dark points. Accordingly, nevertheless the object picture element 100 is a bright point (and has noise in this case), the judgment is a dark point.

This processing enables the clear processed image 73 that does not have noise, to be obtained.

[step 15] (refer to FIGS. 6, 12, 14, 15, 20)

The following is a description of step 15.

Figure 20:
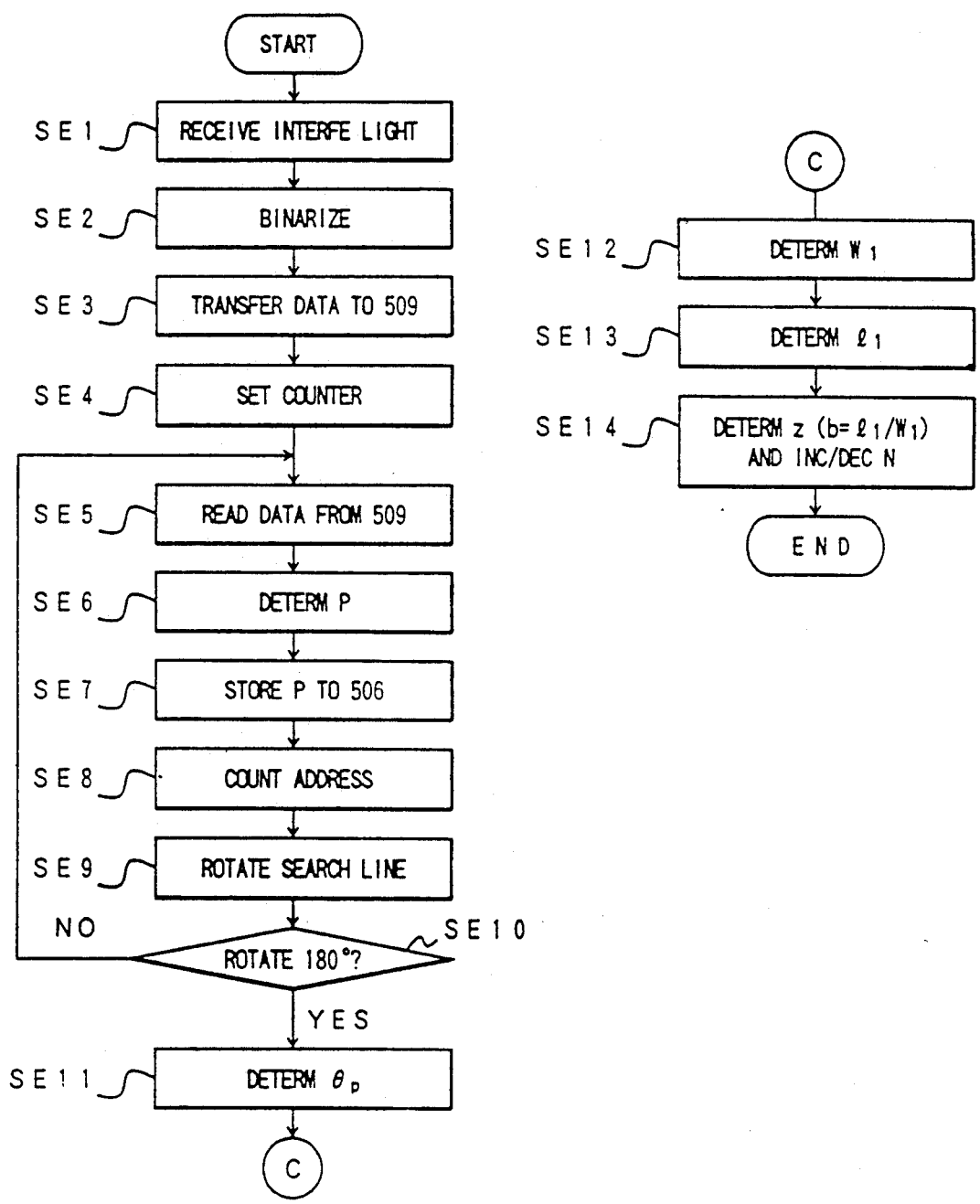
FIG. 20 is a flow chart showing in detail the operation of step ST15 of FIG. 8.

As shown in FIG. 20, the area camera element 57 of FIG. 6 first receives the interference light (SE1). Furthermore, the signal from the element 57 is binarized by the slice level t (SE2) and the binarized data is transferred to the optical interference image memory 509 (SE3).

Furthermore, the Y axis through which the measurement point passes is made the start line and set in the counter (SE4), and the brightness data on the line set in the counter is read from the optical interference memory 509 (SE5).

Then, the length of one frequency of binary signal that sandwitch the measurement point, that is, the pitch P is determined (SE6) as shown FIG. 14 (C) and stored in the RAM 506 (SE7).

Furthermore, the RAM address is counted up (SE8).

The search line is then rotated clockwise by a required angle using the measurement point as the origin, that is, the search line is counted up (SE9).

Steps SE5 through SE9 are performed and there is rotation until 180° is reached (SE10). When the rotation has reached 180°, the angle $\theta p$ for where the pitch P between peaks becomes minimum is determined and that direction is made the minimum width direction, as shown in FIG. 12 (SE11).

With respect to the binarized brightness data for the minimum width direction $\theta p$, the minimum width $W_1$ of the bright or dark stripe that includes the measurement point 12Z-a is determined (SE12) and furthermore, the distance from the measurement point to the end portion is determined as $l_1$ (SE13).

Accordingly, as shown in FIG. 15 (B), the value in the vertical (z) direction after displacement is determined and when the interference stripes move from bright to dark or from dark to bright, the value of the interference stripe number counter N is incremented or decremented in consideration of the direction of vertical displacement (SE14).

[step 15-2] (refer to FIGS. 6, 7, 12, 14, 15, 21).

The following is a description of the processing of step 15-2.

First, the speckle interference light is received by the area Camera element 57 (SF1), and this is made image data of 256 gradations by the A/D converter 371 (SF2). Then, the data is transferred to the image signal difference calculation circuit 377, in which the difference portion with the data on the image memory 373 (prior to movement) is taken. The above data is also passed through a delay circuit 374 and is transferred to an image mixer 378 (SF3). Furthermore, the difference portion image from the circuit 377 and the initial image from the delay circuit 374 are overlapped (SF4). The digital data is transferred to the speckle interference image memory 510 (SF5). The data of the speckle interference image memory 510 is transferred to the digital comparator 514 (SF6).

Then, the slice level t that has already been determined is used for the digital comparator 514 to perform binarization, and this is transferred to a dedicated binary image memory 515 (SF7).

Then, noise remove is performed for the binary data using the method described above (SF8), and the Y-axis through which passes the measurement point is made the start point and the counter is set (SF9). The binary data on the line that is set in the counter is read from the speckle interference image memory 510 (SF10), and the length of one cycle of the binary signals that sandwich the measurement point 12Z-a is determined (SF11), and stored in the RAM 506 (SF12), and the RAM address is counted up (SF13).

After this, the is clockwise rotation of the search line by a certain angle and using the measurement point 12Z-a as the origin, and count up is performed for the search line (SF14). The processing of SF10 through SF14 is performed until the angle of rotation becomes 180° (SF15), and when the angle of rotation has reached 180°, the angle $\theta p$ is determined so that the length of the pitch P becomes minimum, and that direction is made the minimum width direction, as shown in FIG. 12 (SF16).

Furthermore, with respect to the binary brightness data of the minimum width direction $\theta p$, the minimum width $W_1$ of the bright and dark stripe that includes the measurement point is determined ($W_1$) and furthermore, the distance from the measurement point to the end portion of the stripe 1' is determined (SF18). Accordingly, as shown in FIG. 15 (B), the value for the vertical (z) direction after displacement where $b = l_1/W_1$ is determine and when the interference stripe moves from bright to dark or from dark to bright, there is increment or decrement of the value of the interference stripe number counter N in consideration of the direction of the vertical displacement (SF19).

[step S16]

The following is a description of the processing of step 16.

In S16, as described below, the Z displacement amount is calculated from the values (a, b) before and after displacement, and from the value of the interference strip number counter (N).

The Z displacement amount is expressed as follows, $$Z = \lambda N/4 + \lambda(a - b)/4$$
$$= \lambda(N + a - b)/4$$

where, $\lambda(a-b)/4$ is a compensation item.

The fineness of division of the interference lines in the above compensation item improves the degree of resolution and greatly enhances the measurement accuracy.

Moreover, measurement of the Z displacement is then performed.

A total displacement amount from the initial value prior to displacement to the current value, and a sector displacement amount for between th prior measurement value, to the current value are determined by following equations.

SECTOR DISPLACEMENT $\begin{cases} z & \text{displacement measurement result prior to displacement: } a_0 \\ z & \text{displacement measurement result after 1st displacement: } b_1 \\ & \text{1st } z \text{ displacement amount:} \\ & \Delta Z_1 = \lambda(N_1 + a_0 - b_1)/4 \end{cases}$ -continued $$\begin{cases} z \text{ displacement measurement result after 2nd} \\ \text{displacement: } b_2 \\ \text{2nd } z \text{ displacement amount:} \\ \Delta Z_2 = \lambda(N_2 + b_1 - b_2)/4 \end{cases}$$

$$\begin{cases} z \text{ displacement measurement result after 3rd} \\ \text{displacement: } b_3 \\ \text{3rd } z \text{ displacement amount:} \\ \Delta Z_3 = \lambda(N_3 + b_2 - b_3) \text{ etc.} \end{cases}$$

$$\begin{cases} z \text{ displacement measurement result after } n\text{'th} \\ \text{displacement: } b_n \\ n\text{'th } z \text{ displacement amount:} \\ \Delta Z_n = \lambda(N_n + b_{n-1} - b_n)/4 \end{cases}$$

TOTAL DISPLACEMENT $$Z_t = \sum_{i=1}^{n} \Delta Z_i = \lambda(N + a_0 - b_n)/4$$

where, $N = \sum_{i=1}^{n} N_i$

Figure 23:
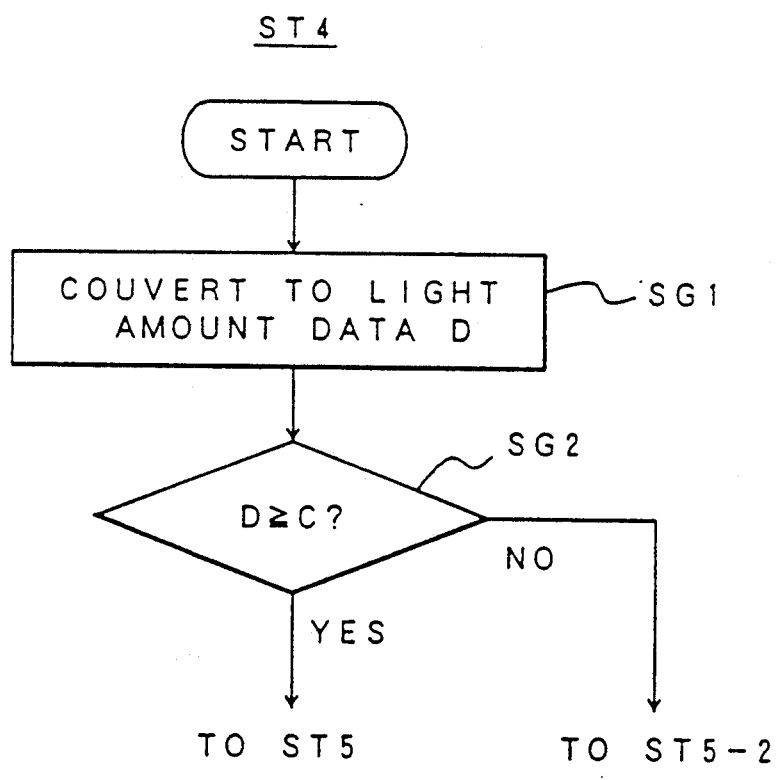
FIG. 23 is a flow chart showing in detail the operation of step ST4 of FIG. 8.

[step ST16] (refer to FIGS. 6, 7, 23)

The following is a description of the operation of ST4, with reference to FIG. 23.

First, the reflected light from the object surface is converted into digital data (light amount data) by the A/D converter 54.

After this, the constant C (threshold level for a mirror surface or a rough surface and which is empirically determined) in the ROM 501 and the light amount data D are compared (SG2).

If the judgment result of SG2 is YES, then the step ST5 of FIG. 8 is performed.

If the judgment result of SG2 is NO, then the step ST5-2 of FIG. 8 is performed.

[Modified example]

Moreover, in the present embodiment, the line sensor 22 is moved in a parallel direction for taking the two-dimensional large-capacity image, and measurement of parallel displacement is performed but it is also possible to have the following input methods.

Figure 24:
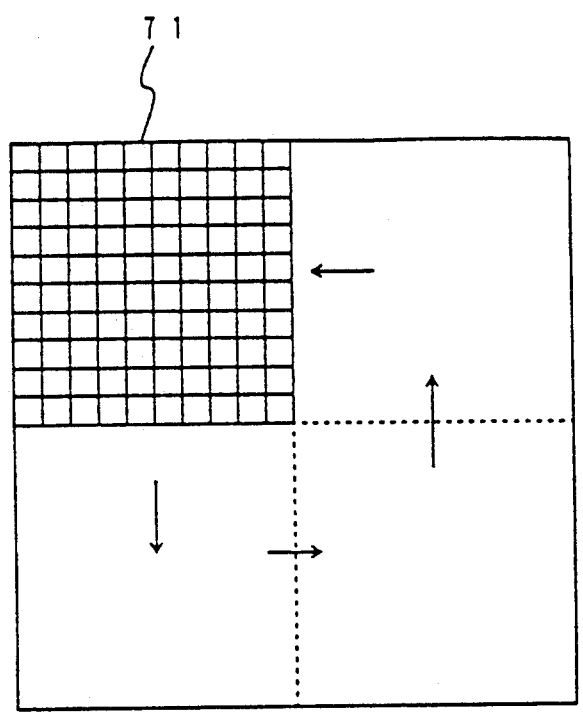
FIG. 24 is a view showing an example of a modification of the camera element of the planar displacement measurement portion.

As shown in FIG. 24, the area camera element 71 is normally moved in blocks and the large-capacity image is input (with the movement being for four blocks in this example). In addition, the large-capacity area camera element can also be used.

In addition, for the vertical displacement, other than the use of the area camera element as in this embodiment, it is possible to use the following image input method.

Figure 25A:
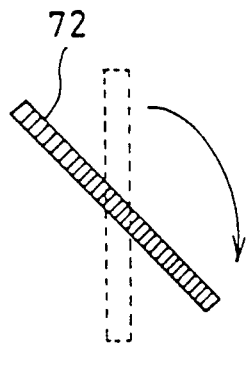
FIG. 25A—B are views showing an example of a modification of the camera element of the vertical displacement measurement portion.
Figure 25B:
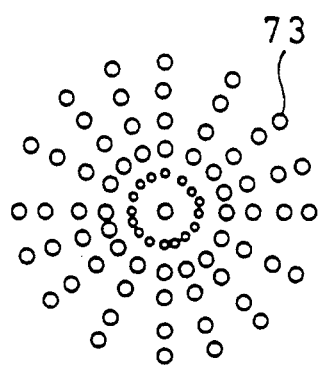

As shown in FIG. 25 (A), it is possible for the interference light to be received while rotating the line sensor 72, and for measurement of the z displacement to be performed.

Furthermore, as shown in FIG. 25 (B), it is also possible to arrange the light receiving elements 73 such as photodiodes concentrically, and to perform rotating scan in the direction of the diameter.

Such a radial arrangement of the camera elements enables more accurate compensation to be performed in accordance with the inclination of the interference stripes In the embodiments, the description was given for the case where it was assumed that the measurement of the sector displacement amount in the z displacement was for the total displacement measurement. However, in order to measure the sector displacement amount, it is necessary to successively swap the initial image (image prior to displacement) in the image memory with the image measured one time prior, for the case of a speckle interference image. For carrying out this swap, a buffer image memory 372 in FIG. 7 has to be provided. By controlling this buffer image memory 371, it is possible to transfer the image that was measured the time before, to the image memory 373.

The present invention is not limited to the emvodiments described above, and variations and modifications may be made without departing from the scope of the present invention.

What is claimed is:

1. A three-dimensional displacement measurement apparatus, comprising:
   a planar displacement measurement portion which has a camera for photographing a surface of a measurement object to output image data, and a planar coordinate calculation portion which calculates a planar coordinate of a measurement point inside said surface from said image data, and which measures a displacement of said measurement point in the direction of an X-Y plane,
   a vertical displacement measurement portion which has an interferometer, and a vertical coordinate calculation portion which calculates a vertical displacement of a surface of said measurement object according to interference stripes of said interferometer, and which measures a displacement of said surface in a vertical direction with respect to the X-Y plane, and
   a vertical displacement measurement position compensation portion that tracks a displacement on a plane of said measurement point measured by said planar displacement measurement portion thereby to move a measurement place of a displacement in a vertical direction by means of said vertical displacement measurement portion.

2. The three-dimensional displacement measurement apparatus as claimed in claim 1, wherein:
   said vertical displacement measurement portion comprises:
   a surface roughness portion which judges whether a surface of said measurement object is a mirror surface or a rough surface, and
   a switching means that when a judgment result of said surface roughness portion is for a mirror surface, makes a reference surface of interference light a regular reflecting surface and when a judgment result of said surface roughness portion is for a rough surface, makes a reference surface of interference light a uniformly absorbing surface, and
   said vertical coordinate calculation portion camprises:
   an optical interference signal processing portion that performs signal processing when said reference surface is the regular reflecting surface, and a speckle interference signal processing portion which performs signal processing when reference surface is the uniform dispersion surface.

3. The three-dimensional displacement measurement apparatus as claimed in claim 1, wherein:

said planar displacement calculation portion of said planar displacement measurement portion uses a template having four straight lines radially arranged, to scan a circular mark provided on the surface of said object of measurement, and calculates a displacement of said circular mark in the X-Y planar direction.

4. The three-dimensional displacement measurement apparatus as claimed in claim 1, wherein:

a vertical coordinate calculation portion of said vertical displacement measurement portion measures a phase of an interference stripe and also measures a number of interference stripes before and after measurement, and uses a number and phase of interference stripes as the basis to calculate vertical coordinates.

5. The three-dimensional displacement measurement apparatus as claimed in claim 1, wherein:

said vertical displacement measurement portion has a noise removal portion that applies a matrix template to a speckle interference stripe in a manner such that a center of the matrix template coincide with a measurement picture element of the speckle interference stripe, and compares a number of bright points and dark points inside said matrix template, and judges a status of said measurement picture element as the majority status.

6. The three-dimensional displacement measurement apparatus as claimed in claim 1, wherein:

said vertical displacement measurement portion has a variable inclination platform, and said measurement object is mounted on the variable inclination platform, a predetermined inclination is given to said measurement object to change interference stripes, a status of change of said interference stripes being used to judge a displacement direction in a Z direction of a surface of said measurement object.

7. A three-dimensional displacement measurement method comprising the processes of:

a process for measuring an X-Y coordinate of one measurement point of a surface of a measurement object prior to displacement, a process for determining a value l/w for the z direction of a measurement point, where l is a distance from a measurement point to an end portion of a stripe and w is a minimum width of a stripe that includes a measurement point, a process for operating said measurement object to displace said measurement point, a process for measuring XY coordinates of said measurement point after said measurement point has been displaced, a process for calculating a displacement amount in an XY planar direction on the basis of XY coordinates after displacement and XY coordinates prior to displacement obtained by said measurement processes, a process for compensating a position of a point for measurement of a z direction displacement on the basis of a displacement amount in an XY planar direction of said measurement point, a process for determining a z-direction value $l_1/w_1$ of a point campensated by said compensating process where $l_1$ is a distance from a measurement point to an end portion of a stripe, and $w_1$ is a minimum width of a stripe that includes a measurement point, and a process for calculation of a z-direction displacement amount.

* * * * *

UNITED STATES PATENT AND TRADEMARK OFFICE
CERTIFICATE OF CORRECTION

PATENT NO. : 5,301,003
DATED : April 5, 1994
INVENTOR(S) : Hiroshi IKEDA

It is certified that error appears in the above-indentified patent and that said Letters Patent is hereby corrected as shown below:

Column 2, Line 13, change "be come" to --become--.*
Line 52, change "FIG." to --FIGS.--.

Column 6, Line 11, change "te" and to --the--.*

Column 7, Line 2, change "." to --,--.
Line 8, change "63" to --363--.

Column 8, Line 21, change "th" to --the--.

Column 11, Line 1, change "he" to --the--.*
Line 16, change "s" to --is--.*
Line 22, change "it" to --the--.*

Column 15, Line 3, change "Camera" to --camera--.

Column 16, Line 26, change "determine" to --determined--.*

Column 18, Line 6, after "stripes" insert --.--.*
Lines 64 and 65, change "camprises" to --comprises--.*

Column 20, Line 31, change "campensated" to --compensated--.

UNITED STATES PATENT AND TRADEMARK OFFICE
CERTIFICATE OF CORRECTION

PATENT NO. : 5,301,003
DATED : April 5, 1994
INVENTOR(S) : Hiroshi IKEDA

It is certified that error appears in the above-indentified patent and that said Letters Patent is hereby corrected as shown below:

Column 18, Line 6, after "stripes" insert --,--.*
            Lines 64 and 65, change "camprises" to --comprises--.*

Column 20, Line 31, change "campensated" to --compensated--.

Signed and Sealed this

Twentieth Day of September, 1994

Attest:

BRUCE LEHMAN

Attesting Officer      Commissioner of Patents and Trademarks